(12) United States Patent
Bagnell et al.

(10) Patent No.: US 11,989,020 B1
(45) Date of Patent: May 21, 2024

(54) TRAINING MACHINE LEARNING MODEL(S), IN SIMULATION, FOR USE IN CONTROLLING AUTONOMOUS VEHICLE(S)

(71) Applicant: Aurora Innovation, Inc., Palo Alto, CA (US)

(72) Inventors: James Andrew Bagnell, Pittsburgh, PA (US); Arun Venkatraman, Mountain View, CA (US); Sanjiban Choudhury, Pittsburgh, PA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 536 days.

(21) Appl. No.: 17/125,231

(22) Filed: Dec. 17, 2020

Related U.S. Application Data

(60) Provisional application No. 63/051,730, filed on Jul. 14, 2020.

(51) Int. Cl.
*G05D 1/00* (2006.01)
*G05B 13/02* (2006.01)
*G06N 3/084* (2023.01)

(52) U.S. Cl.
CPC ......... *G05D 1/0088* (2013.01); *G05B 13/027* (2013.01); *G05D 1/0221* (2013.01); *G06N 3/084* (2013.01); *G05D 2201/0213* (2013.01)

(58) Field of Classification Search
CPC ............... G05D 1/0088; G05D 1/0221; G05D 2201/0213; G05B 13/027; G06N 3/084

(Continued)

(56) References Cited

U.S. PATENT DOCUMENTS 11,034,361 B2   6/2021 Boss et al.
11,354,913 B1*  6/2022 Houston ................. G06F 18/24
(Continued)

FOREIGN PATENT DOCUMENTS

WO   20170115940   7/2017
WO   20220146721   7/2022
WO   20220146722   7/2022

OTHER PUBLICATIONS

International Searching Authority; Search Report and Written Opinion for PCT Application No. PCT/US2021/063989; 17 pages; dated Apr. 14, 2022.

(Continued)

*Primary Examiner* — Hung Q Nguyen
*Assistant Examiner* — Anthony Donald Taylor, Jr.
(74) *Attorney, Agent, or Firm* — Gray Ice Higdon

(57) ABSTRACT

Systems and methods for training a machine learning ("ML") model for use in controlling an autonomous vehicle ("AV") are described herein. Implementations can obtain an initial state instance from driving of a vehicle, obtain ground truth label(s) for subsequent state instance(s) that each indicate a corresponding action of the vehicle for a corresponding time instance, perform, for a given time interval, a simulated episode, of locomotion of a simulated AV, generate, for each of a plurality of time instances of the given time interval, subsequent simulated state instance(s) that differ from the subsequent state instance(s), determine, using the ML model, and for each of the time instances, a predicted simulated action of the simulated AV based on the subsequent simulated operation instance(s), generate loss(es) based on the predicted simulated actions and the ground truth labels, and update the ML model based on the loss(es).

20 Claims, 9 Drawing Sheets

(58) Field of Classification Search
USPC .......................................................... 706/12
See application file for complete search history.

(56) References Cited

U.S. PATENT DOCUMENTS

| | | | |
|---|---|---|---|
| 2016/0285700 A1 | 9/2016 | Gopalakrishnan et al. | |
| 2017/0286845 A1 | 10/2017 | Gifford et al. | |
| 2019/0009794 A1 | 1/2019 | Toyoda et al. | |
| 2019/0049967 A1 | 2/2019 | Lim et al. | |
| 2019/0114546 A1* | 4/2019 | Anil | G06N 3/084 |
| 2019/0161080 A1* | 5/2019 | Gochev | G08G 1/127 |
| 2019/0303759 A1* | 10/2019 | Farabet | G06F 9/455 |
| 2019/0318206 A1 | 10/2019 | Smith et al. | |
| 2020/0039521 A1* | 2/2020 | Misu | B60W 40/09 |
| 2020/0074266 A1* | 3/2020 | Peake | G06F 18/2411 |
| 2020/0089246 A1 | 3/2020 | McGill et al. | |
| 2020/0210721 A1* | 7/2020 | Goel | G06F 18/24 |
| 2020/0269875 A1* | 8/2020 | Wray | B60W 30/0953 |
| 2020/0387156 A1 | 12/2020 | Xu et al. | |
| 2022/0188624 A1 | 6/2022 | Kuehnle et al. | |

OTHER PUBLICATIONS

International Searching Authority; Search Report and Written Opinion for PCT Application No. PCT/US2021/064022; 14 pages; dated Apr. 11, 2022.
Berlincioni, Lorenzo et al; Multiple Future Prediction Leveraging Synthetic Trajectories; Oct. 18, 2020; 8 pages.
Makansi, Osama et al; Overcoming Limitations of Mixture Density Netowrks: A Sampling and Fitting Framework for Multimodal Future Prediction; Jun. 8, 2020; 18 pages.
Boulton, Freddy A., et al; Motion Prediction Using Trajectory Sets and Self-Driving Domain Knowledge; Jun. 8, 2020; 12 pages.
Zhang, Lingyao et al; Map-Adaptive Goal-Based Trajectory Prediction; Nov. 14, 2020; 14 pages.
Liang, Junwei et al; The Garden of Forking Paths: Towards Multi-Future Trajectory Prediction; Jun. 13, 2020; 12 pages.
United States Patent and Trademark Office, Non-Final Office Action for U.S. Appl. No. 17/137,095 dated May 24, 2022, 59 pages.
Carvalho, A.M. (2016); Predictive Control Under Uncertainty for Safe Autonomous Driving: Integrating Data-Driven Forecasts with Control Design, University of California, Berkeley (year 2016).
United States Patent and Trademark Office, Non-Final Office Action for U.S. App. No. 17/137,100 dated Jul. 11, 2022, 46 pages.
Bansal et al; ChauffeurNet: Learning to Drive by Imitating the Best and Synthesizing the Worst; Dec. 7, 2018, 20 pages.
Gao et al; VectorNet: Encoding HD Maps and Agent Dynamics from Vectorized Representation; May 8, 2020, 9 pages.
Haan et al; Causal Confusion in Imitation Learning, 33rd Conference on Neural Information Processing Systems (NeurIPS 2019), Vancouver, Canada, 12 pages.
Google AL Blog; A Novel Neural Network Architecture for Language Understanding, Aug. 31, 2017, 9 pages.
Codevilla et al; Exploring the Limitations of Behavior Cloning for Autonomous Driving, 2019, 10 pages.
Kumar et al; Interaction-Based Trajectory Prediction Over a Hybrid Traffic Graph; Sep. 27, 2020, 12 pages.

* cited by examiner

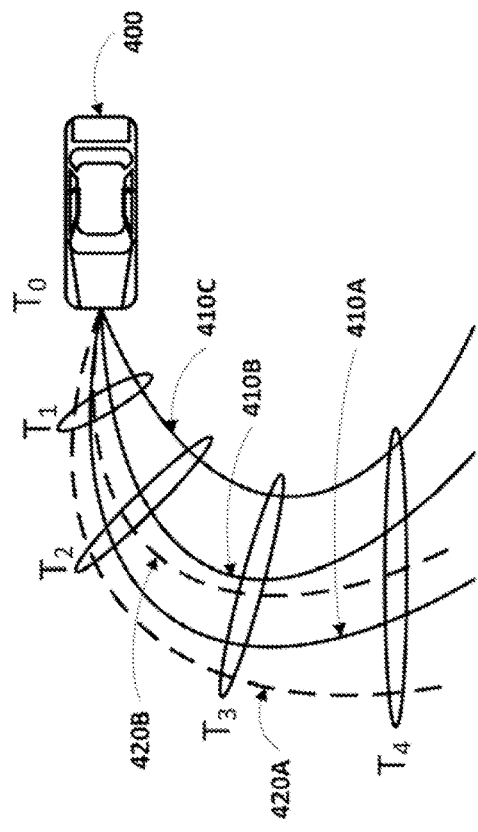

FIG. 4A

| | $T_0$ | $T_1$ | $T_2$ | $T_3$ | $T_4$ | ... | $T_N$ |
|---|---|---|---|---|---|---|---|
| Demonstrator | Decelerate [$VF_{0,1}$, ..., $VF_{0,M}$] [$EF_{0,1}$, ..., $EF_{0,M}$] | Decelerate [$VF_{1,1}$, ..., $VF_{1,M}$] [$EF_{1,1}$, ..., $EF_{1,M}$] | Decelerate [$VF_{2,1}$, ..., $VF_{2,M}$] [$EF_{2,1}$, ..., $EF_{2,M}$] | Decelerate [$VF_{3,1}$, ..., $VF_{3,M}$] [$EF_{3,1}$, ..., $EF_{3,M}$] | Decelerate [$VF_{4,1}$, ..., $VF_{4,M}$] [$EF_{4,1}$, ..., $EF_{4,M}$] | ... | Decelerate [$VF_{N,1}$, ..., $VF_{N,M}$] [$EF_{N,1}$, ..., $EF_{N,M}$] |
| Simulated | Decelerate [$SVF_{0,1}$, ..., $SVF_{0,N}$] [$SEF_{0,1}$, ..., $SEF_{0,N}$] | Accelerate [$SVF_{1,1}$, ..., $SVF_{1,N}$] [$SEF_{1,1}$, ..., $SEF_{1,N}$] | Accelerate [$SVF_{2,1}$, ..., $SVF_{2,N}$] [$SEF_{2,1}$, ..., $SEF_{2,N}$] | Accelerate [$SVF_{3,1}$, ..., $SVF_{3,N}$] [$SEF_{3,1}$, ..., $SEF_{3,N}$] | Accelerate [$SVF_{4,1}$, ..., $SVF_{4,N}$] [$SEF_{4,1}$, ..., $SEF_{4,N}$] | ... | Accelerate [$SVF_{N,1}$, ..., $SVF_{N,N}$] [$SEF_{N,1}$, ..., $SEF_{N,N}$] |

FIG. 4B

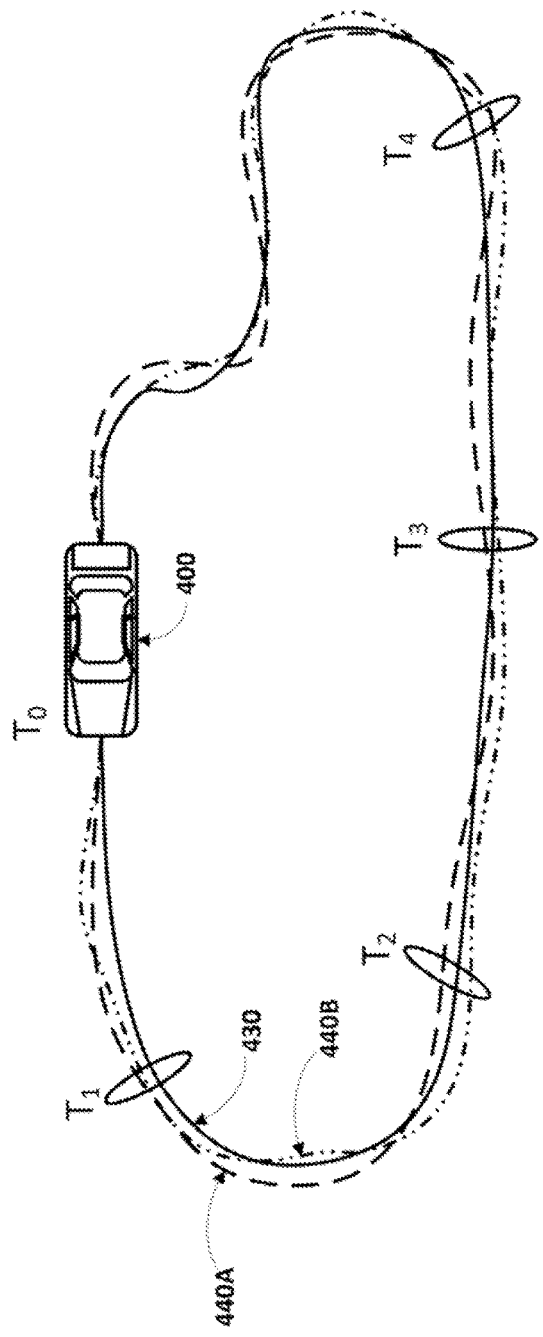

FIG. 4C

| 490D | $T_0$ | $T_1$ | $T_2$ | $T_3$ | $T_4$ | ... | $T_N$ |
|---|---|---|---|---|---|---|---|
| Demonstrator | Accelerate | Decelerate | Accelerate | Accelerate | Decelerate | ... | Decelerate |
| | $[VF_{01}, ..., VF_{0N}]$ $[EF_{01}, ..., EF_{0N}]$ | $[VF_{11}, ..., VF_{1N}]$ $[EF_{11}, ..., EF_{1N}]$ | $[VF_{21}, ..., VF_{2N}]$ $[EF_{21}, ..., EF_{2N}]$ | $[VF_{31}, ..., VF_{3N}]$ $[EF_{31}, ..., EF_{3N}]$ | $[VF_{41}, ..., VF_{4N}]$ $[EF_{41}, ..., EF_{4N}]$ | ... | $[VF_{N1}, ..., VF_{NN}]$ $[EF_{N1}, ..., EF_{NN}]$ |
| Simulated | Accelerate | Accelerate | Decelerate | Decelerate | Decelerate | ... | Decelerate |
| | $[SVF_{01}, ..., SVF_{0N}]$ $[SEF_{01}, ..., SEF_{0N}]$ | $[SVF_{11}, ..., SVF_{1N}]$ $[SEF_{11}, ..., SEF_{1N}]$ | $[SVF_{21}, ..., SVF_{2N}]$ $[SEF_{21}, ..., SEF_{2N}]$ | $[SVF_{31}, ..., SVF_{3N}]$ $[SEF_{31}, ..., SEF_{3N}]$ | $[SVF_{41}, ..., SVF_{4N}]$ $[SEF_{41}, ..., SEF_{4N}]$ | ... | $[SVF_{N1}, ..., SVF_{NN}]$ $[SEF_{N1}, ..., SEF_{NN}]$ |

FIG. 4D

TRAINING MACHINE LEARNING MODEL(S), IN SIMULATION, FOR USE IN CONTROLLING AUTONOMOUS VEHICLE(S)

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relates to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

SUMMARY

Consistent with one aspect of the invention, a method for training a machine learning ("ML") model for use by an autonomous vehicle ("AV") is described herein. The method may include obtaining an initial state instance from a past episode of driving of a vehicle, the initial state instance including state data for a time instance of the past episode, and obtaining, for the initial state instance and for each of plurality of subsequent time instances of the past episode, a corresponding ground truth label that is based on manual driving data during the past episode or subsequent annotation of the past episode. The method may further include performing a simulated episode of driving of a simulated AV, wherein performing the simulated episode includes: initializing the simulated episode based on the initial state instance, and progressing the simulated AV, during the simulated episode, based on one or more predictions made by processing one or more instances of simulated state data using the ML model. Progressing the simulated AV based on the one or more predictions causes the simulated AV to progress in a different manner than did the vehicle in the past episode. The method may further include updating the ML model based on one or more losses that are based on comparing the predictions and the ground truth labels.

These and other implementations of technology disclosed herein can optionally include one or more of the following features.

In some implementations, updating the ML model based on the one or more losses may include updating the ML model based on the one or more losses subsequent to performing the simulated episode and prior to performing any subsequent simulated episode based on the ML model.

In some versions of those implementations, the method may further include, subsequent to updating the ML model based on the one or more losses: performing an additional simulated episode of driving of the simulated AV, where performing the additional simulated episode may include initializing the additional simulated episode based on the initial state instance, and progressing the simulated AV, during the additional simulated episode, based on one or more additional predictions made using the ML model. The one or more additional predictions may vary from the one or more predictions as a result of the one or more additional predictions being made using the ML model subsequent to updating the ML model based on the one or more losses. The method may further include updating the ML model based on one or more losses that are based on comparing the predictions and the ground truth labels.

In some versions of those implementations, progressing the simulated AV during the simulated episode may include: progressing the simulated episode for a first quantity of time instances that each comprise processing a corresponding one of the instances of simulated state data using the ML model to generate a corresponding one of the predictions, and progressing the simulated AV based on the corresponding one of the predictions, and the method may further include continuing, until one or more conditions are satisfied, to iteratively update the model based on further losses, each of the further losses based on comparing one or more corresponding further predictions to the ground truth labels, and the one or more corresponding further predictions each based on a corresponding simulated episode that is also initialized based on the initial state instance and is also progressed for the first quantity of time instances and using the ML model as most recently updated. In some further versions of those implementations, the method may further include, in response to determining the one or more conditions are satisfied: iteratively updating the model based on yet further losses, each of the yet further losses based on comparing one or more corresponding yet further predictions to the ground truth labels, and the one corresponding yet further predictions to the ground truth labels, and the one or more yet further corresponding predictions each based on a corresponding yet further simulated episode that is also initialized based on the initial state instance, but is progressed for a second quantity of time instances using the ML model as most recently updated. The second quantity of time instances may be greater than the first quantity of time instances. In yet further versions of those implementations, the first quantity is one and the second quantity is two. In other yet further versions of those implementations, the one or more conditions may include determining that the machine learning model, as most recently updated, has converged. In even further versions of those implementations, determining that the machine learning model, as most recently updated, has converged, may include determining that a corresponding one of the further losses satisfies a threshold.

In some implementations, the method may further include, prior to performing the simulated episode of driving of the simulated AV: processing the initial state instance and additional state instances of the past episode, using the ML model, to generate corresponding past episode based predictions, and generating one or more past losses for the past episode. Generating each of the past losses may be based on comparing a corresponding one of the past episode based predictions to a corresponding one of the ground truth labels. The method may further include updating the ML model based on the one or more past losses.

In some implementations, the corresponding predictions may each include corresponding probabilities for one or more actions. In some versions of those implementations, the one or more actions may include one or more acceleration values, one or more deceleration values, or one or more steering angle values. In some versions of those implementations, the one or more actions may each indicate one or more of whether to yield, whether to stop, and whether to merge.

Consistent with another aspect of the invention, a method for training a ML model for use by an AV is described herein. The method may include obtaining an initial demonstrator state instance from driving of a vehicle, and obtaining a plurality of ground truth labels for subsequent demonstrator state instances that are subsequent to the initial demonstrator state instance, each of the ground truth labels indicating a corresponding action of the vehicle for a corresponding time instance. The method may further include performing, for a given time interval, a simulated episode, of locomotion of a simulated AV. The simulated episode may be initialized based on the initial demonstrator state instance, and the given time interval may include a plurality of time instances. The method may further include, during performance of an iteration of the simulated episode, and for each of the plurality of time instances for the iteration of the simulated episode: determining, based on processing the initial demonstrator state instance using the ML model, one or more predicted simulated actions of the simulated AV, implementing the one or more predicted simulated actions of the simulated AV to generate one or more subsequent simulated state instances that differ from the subsequent demonstrator state instances, generating, based on the one or more subsequent simulated state instances and the subsequent demonstrator state instances, one or more losses, and updating the ML model based on one or more of the losses.

These and other implementations of technology disclosed herein can optionally include one or more of the following features.

In some implementations, generating one or more of the losses may include comparing the one or more subsequent simulated state instances to a temporally corresponding one of the subsequent demonstrator state instances. Generating one or more of the losses may be based on comparing the one or more simulated state instances to the temporally corresponding one of the subsequent demonstrator state instances. In some versions of those implementations, updating the ML model based on the one or more losses further may further include backpropagating the one or more losses across the ML model to update the ML model. In some versions of those implementations, the method may further include comparing a first distribution associated with driving of the vehicle to a second distribution associated with the simulated episode of locomotion of the simulated AV. The first distribution may be a function of features of the initial demonstrator state instance and features of one or more of the subsequent demonstrator state instances, and the second distribution may be a function of one or more of features of the subsequent simulated state instances. Generating one or more of the losses may include generating one or more weighted losses based on comparing the first distribution and the second distribution. In some further versions of those implementations, updating the ML model based on the one or more losses further may include backpropagating the one or more weighted losses across the ML model to update the ML model during performance of the simulated episode.

In some implementations, the method may further include, prior to performing the simulated episode: receiving user input that modifies one or more features of the initial demonstrator state instance to generate a modified initial demonstrator state instance. The simulated episode may be initialized based on the modified initial demonstrator state instance. In some versions of those implementations, the one or more features of the initial demonstrator state instance that are modified may include one or more of: a decelerating state feature, an accelerating state feature, a constant velocity state feature, a merging state feature, a yielding state feature, or a lane change state feature.

In some implementations, implementing the one or more predicted simulated actions of the simulated AV to generate one or more subsequent simulated state instances that differ from the subsequent demonstrator state instances may include implementing a first predicted simulated action to generate a first subsequent simulated state instance of the one or more subsequent simulated state instances, where the first predicted simulated action is determined based on processing, using the ML model, the initial demonstrator state instance, and implementing a second predicted simulated action to generate a second subsequent simulated state instance of the one or more subsequent simulated state instances, where the second predicted simulated action is determined based on processing, using the ML model, the first subsequent simulated state instance.

In some implementations, the method further includes, prior to obtaining the real operating state instance: identifying a set of training instances, each of training instances of the set including training instance input and corresponding training instance output, where the training instance input including a training demonstrator state instance from driving of the vehicle for a particular time instance, and where the corresponding training instance output including one or more training ground truth labels that indicate the corresponding action of the vehicle for the particular time instance. The method may further include training the ML model based on the set of the training instances.

In some implementations, performing the simulated episode of locomotion using the simulated AV may include simulating one or more additional vehicles or pedestrians detected in environmental state data of the initial demonstrator state instance from driving of the vehicle.

In some implementations, the method may further include, subsequent to updating the ML model: using the updated ML model to make one or more predictions during autonomous driving of the AV.

In some implementations, the method my further include, prior to obtaining the initial demonstrator instance: receiving user input that defines one or more of: the corresponding action of the vehicle for the corresponding time instance, or the given time interval of the simulated episode.

Consistent with another aspect of the invention, a method for training a ML model for use by an AV is described herein. The method may include obtaining a state instance from a past episode of driving of a vehicle, the state instance comprising state data for a time instance of the past episode, and the state data comprising sensor data from one or more sensors of the vehicle or additional data derived from the sensor data. The method may further include obtaining, for the state instance and for each of one or more subsequent state instances of the past episode that are subsequent to the state instance of the past episode, a corresponding ground truth label that indicates a corresponding action, of the vehicle. The corresponding ground truth label is ascribed for the corresponding time instance. The method may further include performing a simulated episode of locomotion of a simulated AV, where performing the simulated episode includes, for each of a given quantity of one or more iterations: processing, using the ML model, a corresponding simulated state instance, for a corresponding one of the iterations, to generate one or more corresponding predicted measures, where an initially processed simulated state instance, of the corresponding simulated state instances, and where an initial iteration of the iterations, is based on the initial state instance from the past episode, determining, based on the corresponding predicted measures, a corresponding predicted action to implement, and implementing the corresponding predicted action of the simulated AV to generate a corresponding subsequent of the simulated state instances to be processed using the ML model. The method may further include generating one or more losses for the simulated episode. Generating each of the losses is based on comparing at least one of the one or more corresponding predicted measures determined during one of the iterations to a corresponding one of the ground truth labels, and the corresponding one of the ground truth labels is used in determining the loss based on it sequentially corresponding to the corresponding one of the predicted actions. The method may further include updating the ML model based on the one or more losses.

These and other implementations of technology disclosed herein can optionally include one or more of the following features.

In some implementations, updating the ML model based on the one or more losses may include updating the ML model based on the one or more losses subsequent to performing the simulated episode and prior to performing any subsequent simulated episode based on the ML model. In some versions of those implementations, the method may further include, subsequent to updating the ML model based on the one or more losses: performing an additional simulated episode of locomotion of the simulated AV. Performing the additional simulated episode may include, for each of the given quantity of the one or more iterations, processing, using the ML model, a corresponding additional simulated state instance to generate one or more corresponding additional predicted measures, where an initially processed additional simulated state instance, of the corresponding additional simulated state instances, and where an initial of the iterations, is based on the initial state instance from the past episode, determining, based on the corresponding additional predicted measures, a corresponding additional predicted action to implement, and implementing the corresponding additional predicted action of the simulated AV to generate a corresponding subsequent of the simulated state instances to be processed using the ML model. The method may further include updating the ML model based on one or more additional losses that are based on comparing the additional predictions and the ground truth labels.

In some versions of those implementations, the method further includes continuing, until one or more conditions are satisfied, to iteratively update the model based on additional losses, each of the further losses based on comparing one or more corresponding additional predictions to the ground truth labels, and the one or more corresponding additional predictions each based on a corresponding simulated episode that is also for the given quantity of iterations and is also based on the initial state instance from the past episode. In some further versions of those implementations, the method may further include, in response to determining the one or more conditions are satisfied: iteratively updating the model based on further losses, each of the further losses based on comparing one or more corresponding further predictions to the ground truth labels, and the one corresponding yet further predictions to the ground truth labels, and the one or more further corresponding predictions each based on a corresponding simulated episode that is also based on the initial state instance from the past episode, but is for an additional quantity of iterations that is one more iteration than the given quantity.

In some implementations, the method may further include, prior to performing the simulated episode of locomotion of the simulated AV: processing each the subsequent state instances of the past episode, using the ML model, to generate corresponding past episode based predicted measures, and generating one or more past losses for the past episode. Generating each of the past losses may be based on comparing a corresponding one of the past episode based predicted measures to a corresponding one of the ground truth labels. The method may further include updating the ML model based on the one or more past losses.

In some implementations, the vehicle is a real world vehicle. In some implementations, the corresponding predicted actions may each indicate one or more of a corresponding magnitude of acceleration, a corresponding magnitude of deceleration, or a corresponding magnitude of a steering angle. In some implementations, the corresponding predicted actions each indicate one or more of whether to yield, whether to stop, and whether to merge. In some implementations, the initially processed simulated state instance may conform strictly to the initial state instance from the past episode, but for being simulated. In some implementations, obtaining the corresponding ground truth labels may include obtaining a given one of the corresponding ground truth labels for the initial state instance. In some implementations, updating the ML model based on one or more of the losses may include backpropagating the one or more losses across the ML model to update the ML model.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

The above description is provided as an overview of some implementations of the present disclosure. Further description of those implementations, and other implementations, are described in more detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 4A and 4B illustrate an example simulated episode based on a forward simulation technique, of locomotion of a simulated AV, performed in the simulation environment of FIG. 3, and a corresponding timeline of demonstrator actions and corresponding demonstrator state instances, and predicted simulated actions and corresponding simulated state instances, in accordance with various implementations.

FIGS. 4C and 4D illustrate an example simulated episode based on an iterative simulation technique, of locomotion of a simulated AV, performed in the simulation environment of FIG. 3, and a corresponding timeline of demonstrator actions and corresponding demonstrator state instances, and predicted simulated actions and corresponding simulated state instances, in accordance with various implementations.

DETAILED DESCRIPTION

Figure 1:
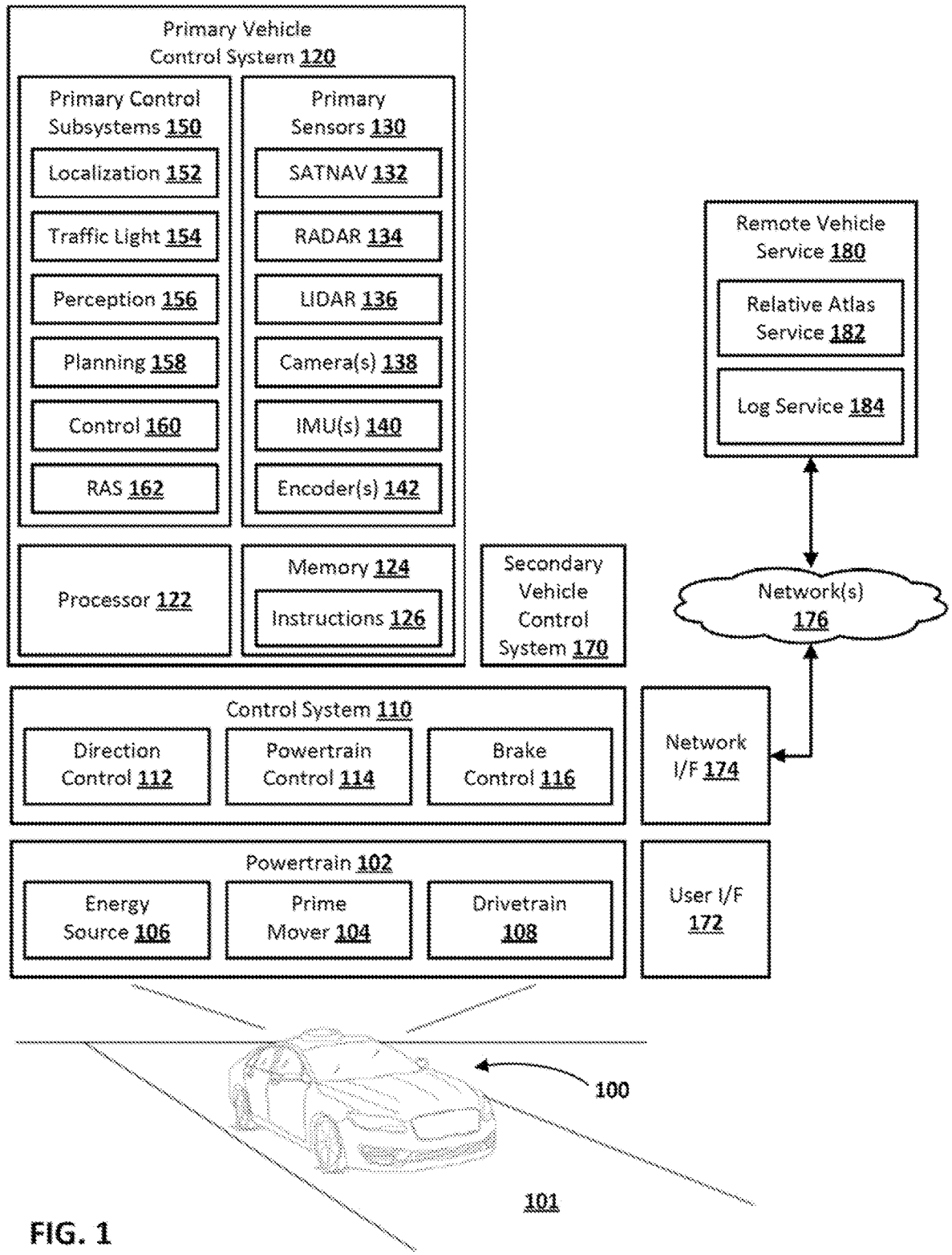
FIG. 1 illustrates an example hardware and software environment for an autonomous vehicle, in accordance with various implementations.

Behavioral cloning is one of the simplest forms of imitation learning since it allows a control policy to be learned (e.g., a machine learning ("ML") model, that represents the control policy, to be trained) directly based on demonstration data, such as demonstrator state instances generated from past episodes of driving of a vehicle. However, this type of learning has two main problems when the learned control policy or trained ML model is used in the real world by an autonomous vehicle ("AV")—causality and feedback.

With respect to the causality problem, latent or unobservable features can cause the learned control policy (e.g., trained ML model) used by the AV to overweight correlation of certain feature(s) in the demonstration data with a given action, while underweighting correlation of other feature(s) with the given action. This can be despite the over weighted certain feature(s) not being the cause of the given action, and the underweighted other feature(s) actually being the cause of the given action. For example, assume that a given ML model is being trained based on demonstrator state instances of driving of a vehicle (manual or otherwise) just prior to initiating a lane change action. In this example, the trained ML model may overweight a feature associated with a blinker indicator associated with the lane change of the vehicle as being strongly correlated with the lane change action. However, the blinker indicator is a result of determining to initiate the lane change action and not actually a cause of the lane change action. Rather, other feature(s) may be the cause of the lane change action, but their correlation may be underweighted for the lane change action or may not be provided as input to the ML model. For instance, the autonomous vehicle's current speed and a speed of another vehicle in front of the autonomous vehicle can be such other feature(s).

Further, with respect to the feedback problem, past actions can cause the learned control policy or trained ML model used by the AV to overweight past actions as being indicative of a future action. Continuing with the above example, since the vehicle has yet to initiate the lane change action, the AV may not initiate the lane change action. These problems are often compounded when other environments and features are encountered in the real world by an AV that were not included in the demonstrator state instances on which the control policy is learned or the ML model is trained.

The present disclosure is directed to particular method(s) or system(s) for training a ML model for use in controlling an AV. Various implementations described herein relate to training the ML model, for use by the AV, using technique(s) that adapt behavior cloning, and that address the causality problem, the feedback problem, or other problem(s). The ML model can represent a control policy and can be trained based on simulated episodes of locomotion of a simulated AV in a simulated environment. A simulated episode can be generated based on a past episode of driving of a vehicle. The past episode may include a sequence of demonstrator state instances generated during the past episode. A demonstrator state instance from the past episode can include state data for a time instance, where the state data includes sensor data from sensor(s) of the vehicle (e.g., image(s) from camera(s), point cloud data from LIDAR, current speed from vehicle speed sensor, etc.) or additional data predicted based on the sensor data (e.g., classification(s) or pose(s) of object(s) or actor(s) in the environment, as determined from image(s) or point cloud data). The past episodes further include one or more ground truth labels, such as a ground truth label for a respective demonstrator state instance of each of the demonstrator state instances. The ground truth labels can be assigned based on manual driving data during the past episode and further annotation. In some implementations, the driving data can be manual driving data that is captured while a human is driving a vehicle in real world in a conventional mode where the conventional mode represents a status of a vehicle when the vehicle is under active physical control of a human operating the vehicle. In other implementations, the driving data can be driving data captured while a virtual human is driving a virtual vehicle in simulated world.

Returning to the generation of the ground truth labels, the driving data of the past episode can be annotated to generate the ground truth labels (e.g., when the driving of the vehicle was by an autonomous system and corrected by subsequent annotation(s), or was by a human (in simulation or real world) and corrected by subsequent human annotation(s)), or human annotation that generates a past episode (e.g., human generating a past episode that includes another vehicle egregiously running a red light). For example, a ground truth label can include an action taken (or an action that should have been taken), a measure for that action (e.g., a probability of 1.0 or other ground truth measure), a magnitude associated with that action, or a steering angle associated with that action.

In performing a simulated episode that is based on a past episode, the simulated episode can be generated based on the past episode in that the environment is initialized based on an initial demonstrator state instance from the past episode of driving the vehicle. For example, the simulated environment can be initialized with the simulated AV in a state that is based on its state as reflected by the initial demonstrator state instance of the past episode, and the simulated environment can be initialized in a state that is based on the state of actors or objects as reflected by the initial demonstrator state instance of the past episode.

However, in some implementations, the simulated episode can differ from the past episode since, in performing the simulated episode, the ML model that is being trained is used to predict simulated action(s) of the simulated AV, and the simulated AV is progressed in the simulated episode based on those predicted simulated action(s). In these implementations, the predicted simulated action(s) can differ from actions performed by the vehicle in the past episode, thereby resulting in simulated state instances that differ from the demonstrator state instances. For example, at one or more of a plurality of iterations during the simulated episode, the ML model can be used to process the initial demonstrator state instance or corresponding simulated state instances and generate corresponding predicted measure(s) for each of a plurality of candidate actions, and implement one of the candidate action(s) based on the corresponding predicted measure(s) (e.g., implement the action with the best measure). As a result, one or more (e.g., all) of the simulated action(s) predicted using the ML model, and implemented in simulation, will differ from those implemented in the past episode of driving of the vehicle. Further, and as a result of implementing the differing predicted simulated action(s), one or more (e.g., all) subsequent simulated state instances, generated during the simulated episode and encountered after an initial simulated state instance of the simulated episode (e.g., that corresponds to the initial demonstrator state instance), will differ from subsequent demonstrator state instances of the past episode that are subsequent to the initial demonstrator state instance of the past episode.

Accordingly, in generating predicted simulated action(s) of the simulated AV during the simulated episode based on processing subsequent simulated state instance(s) using the ML model being trained, one or more of those subsequent simulated state instances will vary from corresponding subsequent demonstrator state instances of the past episode. Despite the subsequent simulated state instances varying from those of the past episode, the ground truth labels of the past episode can nonetheless be utilized as a supervision signal in training the ML model. For example, one or more losses can be generated in a supervised manner based on comparing the predicted measures generated during the simulated episode and corresponding ground truth labels that are indicative of the corresponding actions of the vehicle, and the ML model can be updated based on one or more of the losses. For instance, assume the action(s) predicted using the ML model include a steering angle and the corresponding predicted measures generated at an iteration during simulation include a probability distribution over candidate steering angles. A loss for that iteration can be generated based on, for example, comparing the predicted probability for the action of the ground truth label to "1.0" or other corresponding ground truth probability of the ground truth label. In various implementations, prior to updating the ML model based on one or more of the losses, the losses can be weighted. Weighting one or more of the losses is described in greater detail herein (e.g., with respect to FIG. 9).

Using the corresponding ground truth labels of the past episode as supervision signals, despite the subsequent simulated state instances of the simulated episode and the subsequent demonstrator state instances of the past episode varying, can still be effective for at least simulated episodes of relatively brief durations, in training the ML model to imitate human actions indicated by the corresponding ground truth labels. Further, progressing the simulated episode based on the actions predicted using the ML model, as opposed to the actions indicated by the ground truth labels, enables encountering of unique simulated state instances (unique relative to the demonstrator state instances of the past episode). This enables the ML model to be trained based on such unique simulated state instances, while still utilizing a supervised signal from the past episode. This can result in improved performance of the ML model when deployed for use in autonomous control of a real AV or can mitigate the causality or feedback problems that often plague training based solely on imitation learning as described above.

In various implementations, the ML model can initially be trained in a supervised manner based on the demonstrator state instances of a past episode. For example, where a simulated episode is generated based on a past episode, prior to training the ML model based on the simulated episode, the demonstrator state instances of the past episode and the corresponding ground truth labels can be used to train the ML model. For instance, one or more demonstrator state instances, of the demonstrator state instances of the past episode, can be processed using the ML model to generate a corresponding predicted action. The corresponding predicted action can be compared to a corresponding ground truth label, of the ground truth labels, to generate a corresponding loss. The generated corresponding losses can be utilized to train the ML model. However, in those various implementations, the ML model can also be trained in a supervised manner based on the simulated state instances of a simulated episode. In some implementations, the simulated episode can be generated to mimic the past episode. In other implementations, the simulated episode can be generated to differ from the past episode such that the simulated episode has particular variations to the past episode. This enables the ML model to further be trained using the supervision signals from the ground truth labels of the past episode, but based on predicted action(s) that are generated during the simulation based on simulated state instance(s) that vary from demonstrator state instance of the past episode.

As used herein, the term demonstrator state instance refers to state data of a demonstrator episode of driving of a vehicle. In some implementations, the state data can be associated with a particular time instance. For example, the state data can be time stamped. The state data of a demonstrator state instance can include sensor data generated by one or more sensors of the vehicle, such as an instance of an image from a camera of the vehicle, a point cloud instance from a LIDAR of the vehicle, a current speed of the vehicle from a vehicle speed sensor of the vehicle, etc. The state data of the demonstrator state instance can additionally or alternatively include additional data derived from the sensor data, such as classification(s), pose(s), or other feature(s) (e.g., stationary or not, current rate or direction of travel, etc.) of object(s) (static or dynamic) in the environment, as determined from processing of image(s) or point cloud data. Accordingly, a demonstrator state instance can include state data that reflects a state of the vehicle at a particular time instance (e.g., features of the vehicle), or that reflects state(s) of static or dynamic object(s) near the vehicle at the particular time instance (e.g., features of an environment in which the vehicle is navigating). As some non-limiting examples, the vehicle state instance can include pose information of the vehicle (e.g., position or orientation information), velocity information of the vehicle, acceleration information of the vehicle, an indication of whether or to what extent the vehicle is braking, an indication of whether or to what extent the vehicle is accelerating, an indication of whether or to what extent the vehicle is performing a lane change, an indication of whether or to what extent the vehicle is yielding, an indication of a steering angle of the vehicle, and so on. The environmental state instance can include, for example, corresponding feature(s) for each of one or more environmental objects in an environment of the vehicle. The environmental objects can include, for example, other vehicles in the environment of the vehicle, pedestrians in the environment of the vehicle, roads in the environment of the object, buildings in the environment of the object, and so on. The features of one or more of the environmental objects can include, for example, pose information of the environmental object (e.g., position or orientation information), velocity information of the environmental object, acceleration information of the environmental object, and so on.

The past episode of driving of the vehicle can also be considered an demonstrator episode in that the vehicle is manually controlled during the driving or the vehicle is controlled by an AV control system under the supervision of human supervisors, in that the past episode is subsequently annotated with one or more annotations that directly or indirectly indicate ground truth label(s) for the episode. For example, the demonstrator episode can include driving of a real or simulated vehicle (AV or non-AV car with sufficient sensor(s) for generating state instances), where the driving is performed manually by human drivers or the driving is performed autonomously under the supervision of human supervisors. As another example, the demonstrator episode can include autonomous driving of a real or simulated AV, with subsequent human annotation. Accordingly, the demonstrator state instance can be generated during a past episode of manual driving of an autonomous vehicle, autonomous driving of an autonomous vehicle, manual driving of a non-autonomous vehicle that is retrofitted with one or more sensors described herein, or simulated driving of a vehicle by a demonstrator. Further, the demonstrator state instances can include state information that is ascribed by one or more human demonstrators after the demonstrator state instance is generated. In some additional or alternative implementations, the demonstrator state instances can be manually defined, modified, or altered by a human. For instance, the demonstrator state instance can be defined, modified, or altered after the demonstrator state instance is generated. As one example, if a given demonstrator state instance indicates that an autonomous vehicle, during autonomous driving, yielded to a parked vehicle, and assuming that the autonomous vehicle should not have yielded to the parked vehicle, then the demonstrator state instance may be ascribed, after the demonstrator state instance is generated, to indicate that the autonomous vehicle should not have yielded to the parked vehicle. Any demonstrator state instances modified or altered in this manner can still be considered demonstrator state instances.

As used herein, the term simulated state instance refers to data generated by a simulator in a simulated environment. In some implementations, the simulator can simulate a simulated autonomous vehicle state instance at a particular time instance, or a simulated environmental state instance at the particular time instance. The simulated autonomous vehicle state instance and the simulated environmental state instance are substantially similar to those described above with respect to the demonstrator state instance, but are generated in a simulated environment based on simulated episodes of locomotion of the simulated autonomous vehicle.

Prior to further discussion of these and other implementations, however, an example hardware and software environment within which the various techniques disclosed herein may be implemented will be discussed.

Turning to the drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include powertrain 102 including prime mover 104 powered by energy source 106 and capable of providing power to drivetrain 108, as well as control system 110 including direction control 112, powertrain control 114 and brake control 116. Vehicle 100 may be implemented as any number of different types of vehicles, including vehicles capable of transporting people or cargo, and capable of traveling by land, by sea, by air, underground, undersea or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, prime mover 104 may include one or more electric motors or an internal combustion engine (among others), while energy source 106 may include a fuel system (e.g., providing gasoline, diesel, hydrogen, etc.), a battery system, solar panels or other renewable energy source, a fuel cell system, etc., and the drivetrain 108 may include wheels or tires along with a transmission or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and memory 124, with processors 122 configured to execute program code instructions 126 stored in memory 124.

Primary sensor system 130 may include various sensors suitable for collecting information from a vehicle's surrounding environment for use in controlling the operation of the vehicle. For example, satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134, 136, as well as a camera(s) 138 (which may include various types of vision components capable of capturing still or video imagery), may be used to sense stationary and moving objects within the immediate vicinity of a vehicle. Inertial measurement unit (IMU) 140 may include multiple gyroscopes and accelerometers capable of detection linear and rotational motion of a vehicle in three directions, while wheel encoder(s) 142 may be used to monitor the rotation of one or more wheels of vehicle 100.

The outputs of sensors 132-142 may be provided to a set of primary control subsystems 150, including, localization subsystem 152, traffic light subsystem 154, perception subsystem 156, planning subsystem 158, control subsystem 160, and relative atlas subsystem (RAS) 160. Localization subsystem 152 is principally responsible for precisely determining the location and orientation (also sometimes referred to as pose, which in some instances may also include one or more velocities or accelerations) of vehicle 100 within its surrounding environment, and generally within some frame of reference. As will be discussed in greater detail herein, traffic light subsystem 154 is principally responsible for identifying intersections and traffic light(s) associated therewith, and processing a stream of vision data corresponding to images of the traffic light(s) to determine a current state of each of the traffic light(s) of the intersection for use by planning, control, and RAS subsystems 158-162, while perception subsystem 156 is principally responsible for detecting, tracking, or identifying elements within the environment surrounding vehicle 100. In some implementations, traffic light subsystem 154 may be a subsystem of perception subsystem 156, while in other implementation, traffic light subsystem is a standalone subsystem. Control subsystem 160 is principally responsible for generating suitable control signals for controlling the various controls in control system 110 in order to implement the planned path of the vehicle.

In addition, Relative Atlas Subsystem (RAS) 162 may be provided in the illustrated implementations to describe the elements within an environment and the relationships therebetween. Further, RAS 162 may be accessed by each of the localization, traffic light, planning, and perception subsystems 152-158 to obtain information about the environment for use in performing their respective functions. Moreover, RAS 162 may interact with remote vehicle service 180, over network(s) 176 via network interface (network I/F) 174.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy or to cover different regions around a vehicle, and other types of sensors may be used. Likewise, different types or combinations of control subsystems may be used in other implementations. Further, while subsystems 152-162 are illustrated as being separate from processors 122 and memory 124, it will be appreciated that in some implementations, some or all of the functionality of subsystems 152-162 may be implemented with program code instructions 126 resident in memory 124 and executed by one or more of processors 122. Further, these subsystems 152-162 may in some instances be implemented using the same processors or memory, while in other instances may be implemented using different processors or memory. Subsystems 152-162 in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. Each of processors 122 may be implemented, for example, as central processing unit(s) (CPU(s)), graphics processing unit(s) (GPU(s)), tensor processing unit(s) (TPU(s)), or any combination thereof, and each portion of memory 124 may represent random access memory (RAM) devices comprising a main storage, as well as any supplemental levels of memory, e.g., cache memories, non-volatile or backup memories (e.g., programmable or flash memories), read-only memories, etc. In addition, each portion of memory 124 may be considered to include memory storage physically located elsewhere in vehicle 100, e.g., any cache memory in a processor, as well as any storage capacity used as a virtual memory, e.g., as stored on a mass storage device or on another computer or controller. One or more of processors 122 illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, or a tape drive, among others. Furthermore, vehicle 100 may include a user interface 172 to enable vehicle 100 to receive a number of inputs from and generate outputs for a user or operator, e.g., one or more displays, touchscreens, voice or gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with network(s) 176 (e.g., a LAN, a WAN, a wireless network, Bluetooth, or the Internet, among others) to permit the communication of information with other vehicles, computers, or electronic devices, including, for example, a central service, such as a cloud service, from which vehicle 100 receives environmental and other data for use in autonomous control thereof. In the illustrated implementations, for example, vehicle 100 may be in communication with a cloud-based remote vehicle service 180 including, at least for the purposes of implementing various functions described herein, a relative atlas service 182 and a log service 184. Relative atlas service 182 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Log service 184 may be used, for example, to collect or analyze demonstrator state instances, including vehicle state data or environmental state data, from one or more autonomous vehicles during operation (i.e., during manual operation or autonomous operation), one or more other non-autonomous vehicles retrofitted with one or more of the sensors described herein (e.g., one or more of primary sensors 130), or from simulated driving of a vehicle, enabling updates to be made to the global repository, as well as for other offline purposes such as training machine learning model(s) for use by vehicle 100 (e.g., as described in greater detail herein with respect to FIGS. 2 and 3).

Each of processors 122 illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail herein. Moreover, various applications, programs, objects, modules, or other components may also execute on one or more processors in another computer coupled to vehicle 100 via network(s) 176, e.g., in a distributed, cloud-based, or client-server computing environment, whereby the processing required to implement the functions of a computer program may be allocated to multiple computers or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as program code. Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program codes described hereinafter may be identified based upon the application within which it is implemented in a specific implementation. However, it should be appreciated that any particular program nomenclature that follows is used merely for convenience, and thus the invention should not be limited to use solely in any specific application identified or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware or software environments may be used without departing from the scope of the invention.

Figure 2:
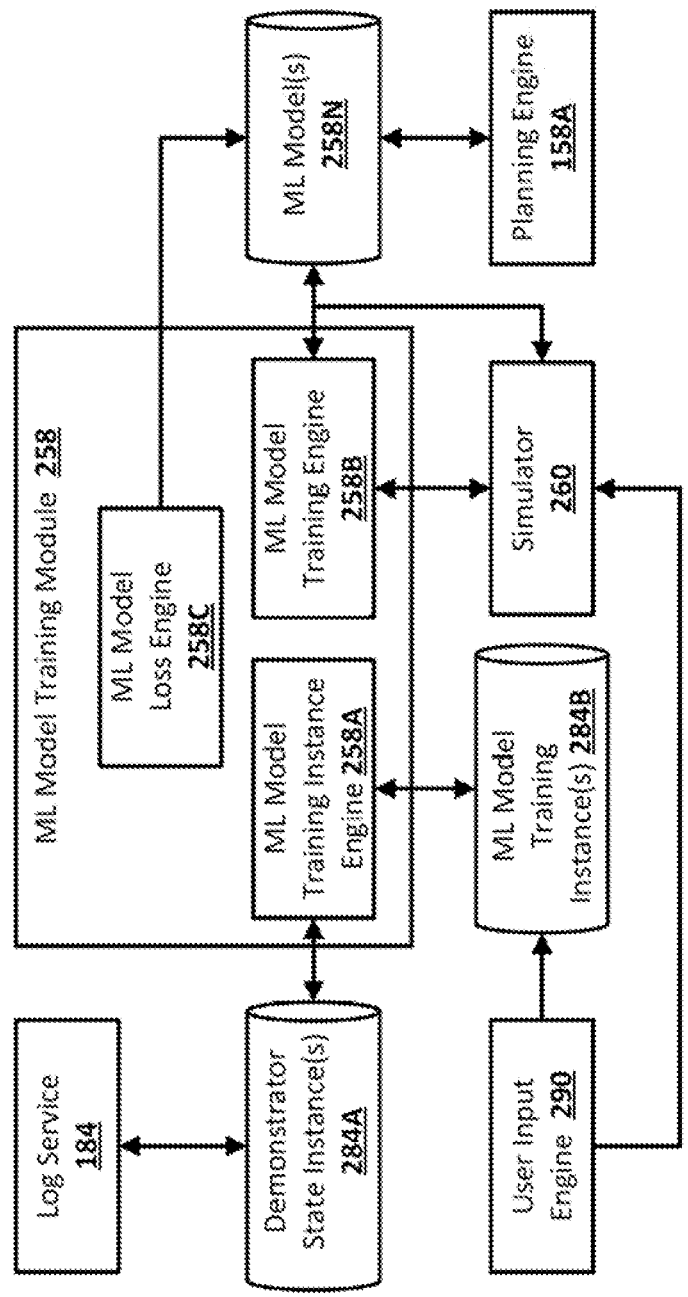
FIG. 2 is a block diagram illustrating an example training architecture for training a machine learning model that is used by a planning subsystem of an autonomous vehicle, in accordance with various implementations.

Turning to FIG. 2, a block diagram illustrating an example training architecture for training a machine learning ("ML") model that used by a planning subsystem (e.g., planning subsystem 158) of an autonomous vehicle ("AV") (e.g., vehicle 100) is depicted. As shown in FIG. 2, ML model training module 258 can include ML model training instance engine 258A, ML model training engine 258B, and ML model loss engine 258C. The ML model training module 258 can be implemented by one or more remote systems in communication over one or more networks (e.g., LAN, WAN, Internet, Wi-Fi, Bluetooth, etc.), or by multiple of the remote systems in a distributed manner. For example, one or more aspects of the ML model training module 258 can be implemented by a first server that includes the ML model, and other aspects of the ML model training module 258 can be implemented by a second server along with a simulator 260. Although particular architectures are depicted herein, it should be understood that is for the sake of example and is not meant to be limiting.

The ML model training instance engine 258A can obtain demonstrator state instance(s) from demonstrator state instance(s) database 284A. As described above with respect to FIG. 1, log service 184 may be used, for example, to collect demonstrator state instances, each including vehicle state data or environmental state data, from one or more AVs during operation (i.e., during manual operation or autonomous operation), one or more other non-autonomous vehicles retrofitted with one or more of the sensors described herein (e.g., one or more of primary sensors 130), from simulated driving of a vehicle, or from annotations by a trusted human. The log service 184 can cause the collected demonstrator state instances to be stored in the demonstrator state instance(s) database 284A. Notably, a given demonstrator state instance may only include corresponding vehicle state data or environmental state data for a particular time instance, such that the given demonstrator state instance captures a state of the vehicle or surroundings of the vehicle at a particular time instance. Further, a plurality of demonstrator state instances may include corresponding vehicle state instances or environmental state instances over a duration of time, such that the plurality of demonstrator state instances capture multiple sequential states of the vehicle or surroundings of the vehicle over the duration of time.

The ML model training instance engine 258A can also obtain a plurality of corresponding ground truth labels for the demonstrator state instance(s). The corresponding ground truth labels can include a corresponding action of the vehicle for a corresponding time instance of the demonstrator state instance(s). Further, the ML model training instance engine 258A can store the demonstrator state instance(s) in association with the plurality of ground truth labels for the demonstrator state instance(s) in ML model training instance(s) database 284B. For example, assume that a plurality of demonstrator state instances correspond to a vehicle stopping in response to a traffic light transitioning from a green state to a yellow state. In this example, an initial demonstrator state can correspond to a particular time instance when the vehicle initially begins to decelerate, and can include pose information of the vehicle at the particular time instance (optionally relative to the traffic light), velocity information of the vehicle at the particular time instance, acceleration information of the vehicle at the particular time instance, an indication that the vehicle is braking at the particular time instance, and information about other vehicles or pedestrians in an environment of the vehicle at the particular time instance. The plurality of demonstrator state instances can further include a plurality of subsequent demonstrator that instances that are each subsequent to the initial demonstrator state instance, and can each include corresponding information that is similar to the initial demonstrator state instance, but for corresponding time instances of one or more of the one or more subsequent demonstrator state instances. Accordingly, one or more of the demonstrator state instances in this example can be associated with corresponding ground truth labels that indicate the vehicle is braking for the yellow light at one or more of the time instances, the vehicle is stopping for the yellow light at one or more of the time instances, or some other label indicating that the vehicle stopped in response to the traffic light transitioning from the green light to the yellow light at one or more of the time instances.

As another example, assume that a plurality of demonstrator state instances correspond to a vehicle changing from a first lane of traffic to a second lane of traffic. In this example, an initial demonstrator state can correspond to a particular time instance when a blinker of the vehicle is turned on to initiate the lane change, and can include pose information of the vehicle at the particular time instance, velocity information of the vehicle at the particular time instance, acceleration information of the vehicle at the particular time instance, steering information of the vehicle at the particular time instance, an indication that the vehicle is braking at the particular time instance, and information about other vehicles or pedestrians in an environment of the vehicle at the particular time instance. The plurality of demonstrator state instances can further include a plurality of subsequent demonstrator state instances that are each subsequent to the initial demonstrator state instance, and can each include corresponding information similar to the initial demonstrator state instance, but for respective time instances of one or more of the subsequent demonstrator state instances. Accordingly, one or more of the demonstrator state instances in this example can be associated with corresponding ground truth labels that indicate the vehicle is changing lanes at one or more of the time instances, the vehicle is accelerating or decelerating to change lanes at one or more of the time instances, or some other label indicating that the vehicle is transitioning from the first lane of traffic to the second lane of traffic at one or more of the time instances.

The ML model training engine 258B can initialize a simulator 260 in a simulation environment based on the ML model simulated training instance(s). More particularly, the ML model training engine 258B can initialize the simulator 260 to perform a simulated episode of locomotion of a simulated AV based on an initial demonstrator state instance stored in the ML model training instance(s) database 284B. In various implementations, user input engine 290 can detect user input. In addition to the initial demonstrator state instance, the user input detected via the user input engine 290 may also be used in initializing the simulator 260 for the simulated episode of locomotion of the simulated AV. In some implementations, the user input detected by the user input engine 290 can include a type of simulation to be performed during the simulated episode of locomotion of the simulated AV based on a given one of the ML model simulated training instance(s). For example, the user input can indicate that the initial demonstrator state instance should correspond to a vehicle beginning to stop at a yellow light, a vehicle beginning to yield to a pedestrian or bicyclist, a vehicle beginning to change lanes, a vehicle maintaining a lane, or a vehicle performing other actions.

In some additional or alternative implementations, the user input detected by the user input engine 290 can include a given time interval for performing the simulated episode of locomotion of the simulated AV. The given time interval can be discretized into a plurality of disparate time instances (e.g., every second, every 500 milliseconds, every 100 milliseconds, and so on) automatically or based on further user input detected via the user input engine 290. In some versions of those implementations, the given time interval can be based on the action being performed during the simulated episode of locomotion. For example, assume that the simulated episode of locomotion of the simulated AV is based on an initial demonstrator state instance that corresponds to a vehicle beginning to stop in response to a traffic light transitioning from a green state to a yellow state, and assume that subsequent state instances collected over the next eight seconds correspond to the vehicle stopping for the traffic light. In this example, the given time interval for the simulated episode of locomotion can be the eight seconds that corresponds to the vehicle stopping in response to the traffic light transitioning from the green state to the yellow state. In contrast, assume that the simulated episode of locomotion of the simulated AV is based on an initial demonstrator state instance that corresponds to a vehicle maintaining a lane along a highway, and assume that subsequent state instances collected over the next five minutes correspond to the vehicle maintaining the lane along the highway. In this example, the given time interval for the simulated episode of locomotion can be the five minutes that corresponds to the vehicle maintaining the lane along the highway.

In some additional or alternative implementations, the user input detected by the user input engine 290 can include altering or modifying one or more vehicle state features in an initial demonstrator state instance. The one or more vehicle state features can include, for example, an indication that the vehicle is braking or decelerating, an indicating that the vehicle is accelerating, an indication that the vehicle is performing a lane change, an indication that the vehicle is yielding, and so on. For example, assume that the simulated episode of locomotion of the simulated AV is based on an initial demonstrator state instance that corresponds to a vehicle beginning to stop in response to a traffic light transitioning from a green state to a yellow state, and assume that one or more vehicle state features indicate that the vehicle is braking or decelerating. In this example, the user input detected by the user input engine 290 may alter or modify the one or more vehicle state features that indicate the vehicle is braking or decelerating at the initial demonstrator state instance to indicate that the vehicle is accelerating at the initial demonstrator state instance. Notably, even though the one or more vehicle state features of the initial demonstrator state instance have been altered or modified to indicate that the vehicle was accelerating instead of braking or decelerating, subsequent vehicle state features of subsequent demonstrator states instances that are subsequent to the initial demonstrator state instance, and the corresponding ground truth labels, will still indicate that the vehicle was braking or decelerating.

Once initialized, the ML model training engine 258B can cause the simulator 260 to utilize a forward simulation technique or an iterative simulation technique that is initialized based on the initial demonstrator state instance, and that is performed for the given time interval determined based on the user input detected via the user input engine 290. These simulation techniques are described in greater detail herein (e.g., with respect to FIGS. 3, 4A-4D, 6, and 7). As noted above, the given time interval can be discretized into a plurality of time instances. Generally, the simulator 260 can process, using a ML model stored in ML model(s) database 258N, the demonstrator state instance to determine a predicted simulated action for a first time instance of the given time interval. Further, the simulator 260 can implement the predicted simulated action to generate a first subsequent simulated state instance of the simulated AV. Notably, the predicted simulated action generated based on the initial demonstrator state instance may differ from a corresponding action taken by the vehicle during the demonstrator state instance. Accordingly, the first subsequent simulated state of the simulated AV may differ from a first subsequent demonstrator state instance. However, even though the subsequent simulated state differs from the first subsequent demonstrator state instance, the simulator 260 should still determine the same action indicated by a corresponding ground truth label for the first subsequent demonstrator state instance (e.g., that the simulated AV should be braking, decelerating, or stopping for the yellow light), and one or more losses can be generated based on the difference therebetween.

For example, assume that the simulated episode of locomotion of the simulated AV is based on an initial demonstrator state instance that corresponds to a vehicle beginning to stop in response to a traffic light transitioning from a green state to a yellow state, and assume that one or more vehicle state features indicate that the vehicle is braking or decelerating. Further assume that the simulator 260 determines, using a ML model stored in the ML model(s) database 258N, and based on the initial demonstrator state instance, a first predicted simulated action that indicates the simulated AV should accelerate. In this example, the first predicted simulated action that indicates the simulated AV should accelerate differs from a first subsequent demonstrator state instance that indicates the vehicle decelerated at a corresponding time instance of the given time interval. For instance, at each subsequent corresponding time instance of the given interval, the simulated AV may be travelling at a faster rate than the vehicle, may be associated with different pose information than the vehicle, etc. This process can be repeated for one or more of the subsequent time instances of the given time interval, and the simulated episode of locomotion of the simulated AV is complete with different variations based on the simulation technique employed by the simulator 260. Initializing the simulator 260 and performing the simulated episodes of locomotion of the simulated AV is described in greater detail herein (e.g., with respect to FIG. 3).

The ML model loss engine 258C can generate one or more losses based on the simulated episode of locomotion of the simulated AV, and can update the ML model stored in the ML model(s) database 258N based on one or more of the losses. For example, the ML model loss engine 258C can update the ML model based on backpropagating one or more of the losses across the ML model, thereby updating weights of the ML model. In some implementations, such as when ML model training engine 258B causes the simulator 260 to utilize a forward simulation technique, the ML model loss engine 258C can initialize the simulator 260 based on an initial demonstrator state instance, and generate one or more of the losses at a first time instance by comparing a given predicted simulated action determined at the first time instance to one or more corresponding ground truth labels determined based on the past episode on which the simulated episode of locomotion is generated. Further, the ML model loss engine 258C can update the ML model after one or more of the time instances and during the simulated episode of locomotion. Moreover, the ML model training engine 258B may then re-initialize the simulator 260 based on the initial demonstrator state instance, and generate one or more further losses at the first time instance in a similar manner. This process can be repeated until the simulated episode converges with the past episode, on which the simulated episode is generated, for the first time instances, and then the simulated episode may proceed to a second time instance of the given time interval of the simulated episode. The ML model training engine 258B can determine that the simulated episode has converged with the past episode when one or more of the losses are zero, or one or more of the losses are within an error threshold of zero. This process can then be repeated for each subsequent time instance of the simulated episode.

For example, assume that, for a first time instance, the simulator 260 determines, using the ML model, and based on an initial demonstrator state instance, a first predicted simulated action, and generates a first subsequent simulated state instance by implementing the first predicted simulated action. The ML model loss engine 258C can generate one or more of the losses by comparing the first predicted simulated action to one or more first ground truth labels associated with a first subsequent demonstrator state instance that immediately follows the initial demonstrator state instance, and can update the ML model based on one or more of the generated losses. In this example, the simulator 260 can determine a further first predicted simulated action, and generate a further first subsequent simulated state instance by implementing the further first predicted simulated action. The ML model loss engine 258C can generate one or more of the further losses by comparing the further first predicted simulated action to one or more of the first ground truth labels associated with the first subsequent demonstrator state instance that immediately follows the initial demonstrator state instance, and can update the ML model based on one or more of the further losses. This process can be repeated until the simulated episode converges with the past episode.

Next, for a second time instance, the simulator 260 can be re-initialized based on the initial demonstrator state instance, but advance beyond the first time instance. For example, assume the simulator 260 determines, using the ML model, and based on processing an additional first subsequent simulated state instance generated based on implementing an additional first predicted simulated action, a second predicted simulated action, and generates a second subsequent simulated state instance. The ML model loss engine 258C can generate one or more of the losses by comparing the additional first predicted simulated action to one or more first ground truth labels associated with the first subsequent demonstrator state instance, and by comparing the second predicted simulated action to one or more second ground truth labels associated with a second subsequent demonstrator state instance that immediately follows the first subsequent demonstrator state instance, and can update the ML model based on one or more of the generated losses. The simulator 260 can be re-initialized and advanced through the second time instance, until the simulated episode converges with the past episode, on which the simulated episode is generated, for the second time instance. This process can be repeated for one or more of the time instances of the given time interval of the simulated episode of locomotion of the simulated AV. Further, the ML model loss engine 258C can weight one or more of the losses during the simulated episode. The one or more additional losses can be weighted based on distributions of demonstrator state instances from the past episode and simulated state instances generated during the simulated episode (e.g., as described in greater detail below with respect to FIG. 9).

In some additional or alternative implementations, such as when ML model training engine 258B causes the simulator to utilize an iterative simulation technique, the ML model loss engine 258C can generate one or more of the losses after each simulated episode of locomotion of the simulated AV by comparing a plurality of predicted simulated actions determined during the simulated episode of locomotion to corresponding ground truth labels determined based on the driving of the vehicle on which the simulated episode of locomotion is generated. The plurality of predicted simulated actions can be generated in a similar manner described above with respect to the forward simulation technique. However, in using the iterative simulation technique, the entire simulated episode of locomotion may be performed prior to generating any losses, and without repeating portions of the simulation until convergence is achieved. In particular, the one or more losses may be generated at various time instances of the simulated episode of locomotion of the simulated AV after the simulated episode of locomotion is performed. In some versions of those implementations, multiple simulated episodes of locomotion may be performed prior to generating any losses. The losses from one or more of the multiple simulated episodes of locomotion can be aggregated and used to update the ML model. In some further versions of those implementations, one or more of the multiple simulated episodes of locomotion may be performed in parallel. Generating one or more of the losses used in updating the ML model is described in greater detail herein (e.g., with respect to FIGS. 3, 4A, and 4B). Subsequent to updating the ML model, one or more additional simulated episodes of locomotion may be performed based on the same initial demonstrator state instance, or a distinct initial demonstrator state instance.

In various implementations, the ML model stored in the ML model(s) database 258N can be initially trained based on an initial set of the training instances stored in the ML model training instance(s) database 284B via behavior cloning, while other sets of the training instances can be withheld for updating the ML model in simulation or testing of the ML model once update. In some versions of those implementations, the ML model training engine 258B can utilize the demonstrator state instances of the initial set as training instance input, and the corresponding ground truth labels of the initial set as training instance output. In particular, the ML model training engine 258B can apply the demonstrator state instances of the initial set as input across the ML model to generate corresponding predicted measures, compare the corresponding predicted measures to the corresponding ground truth labels to generate corresponding losses for one or more of the demonstrator state instances, and update the ML model based on the loss(es) to train the ML model. Subsequent to the initial training, the ML model training engine 258B can update the ML model in the simulated environment as described in greater detail herein (e.g., with respect to FIG. 3). Subsequent to the updating, the ML model can be used by a planning engine 158A of a planning subsystem (e.g., planning subsystem 158) of various AVs (e.g., vehicle 100 or other autonomous vehicles).

The ML model stored in the ML model(s) database 258N can be, for example, a recurrent neural network ("RNN") ML model, such as a long short-term memory ("LSTM"), a ML classifier model, or other ML models. In some implementations, the ML model can be used to process state instances (e.g., vehicle state data thereof or environmental state data thereof), and corresponding predicted measures for one or more of a plurality of candidate actions can be generated across the ML model. The predicted measures can be, for example, corresponding probabilities associated with one or more of the candidate actions, a magnitude associated with one or more of the candidate actions, a steering angle associated with one or more of the candidate actions, or predictions that can be made based on the state instances. For example, assume a given state instance applied as input across the ML model corresponds to the AV (or simulated AV) initiating a yielding action. In this example, the predicted measures can be a probability distribution that includes one or more actions, and a magnitude associated with one or more of the actions, such as [[0.1, Accelerate, $$1.0 \frac{m}{s^2},$$

2.0°], [0.1, Accelerate, $$0.5 \frac{m}{s^2},$$

2.0°], [0.1, Constant Velocity, $$0.0 \frac{m}{s^2},$$

1.0°], [0.3, Decelerate, $$0.5 \frac{m}{s^2},$$

0.0°], [0.4, Decelerate, 1.0, 0.0°]], where the [0.1, 0.1, 0.1, 0.3, 0.4] correspond to probabilities for the predicted actions of [Accelerate, Accelerate, Constant Velocity, Decelerate, Decelerate] correspond to predicted actions for the corresponding probabilities, the $$1.0 \frac{m}{s^2}, 0.5.0 \frac{m}{s^2}, 0.0 \frac{m}{s^2}, 0.5 \frac{m}{s^2}, 1.0 \frac{m}{s^2}$$

correspond to magnitudes for the corresponding predicted action, and the [2.0°, 2.0°, 1.0°, 0.0°, 0.0°] correspond to steering angles for the corresponding predicted actions. Accordingly, in this example, a candidate action of [0.4, Decelerate, 1.0, 0.0°] may be selected as the best action since it is associated with a highest probability (e.g., 0.4).

In some versions of those implementations, multiple machine learning models can be used to generate the corresponding predicted measures. Continuing with the above example, a first ML model can be used to process the given state instance to determine the corresponding probabilities for the predicted actions, a second ML model can be used to process the given state instance to determine the corresponding magnitudes, a third ML model can be used to process the given state instance to determine the corresponding steering angles, and so on for one or more of the corresponding predicted measures. In some further versions of those implementations, a subset, or all, of the ML models can be used to generate the predicted measures. Put another way, in some instances, only the first ML model may be used to process the state instance, whereas, in other instances, multiple of the ML models may be used to process the state instance.

In some additional or alternative versions of those implementations, the ML model can be used to process the candidate actions along with the state instances (or state data thereof). In these implementations, the dimensionality of the distribution generated using the ML model may be greatly reduced. However, the ML model may be used to process more state instances and candidate actions (optionally along with magnitude or steering components). Continuing with the above example, a first predicted measure can be a first corresponding probability of 0.2 that is determined based on the given state instance and the candidate action of accelerate, a second predicted measure can be a second corresponding probability of 0.8 that is determined based on the given state instance and the candidate action of decelerate. Accordingly, in this example, a candidate action of decelerate may be selected as the best action since it is associated with a highest probability (e.g., 0.8). In various implementations, the predicted actions described herein can be determined based on the predicted measures for the candidate actions generated across the ML model by selecting the best candidate action based on the predicted measures generated across the ML model.

Figure 3:
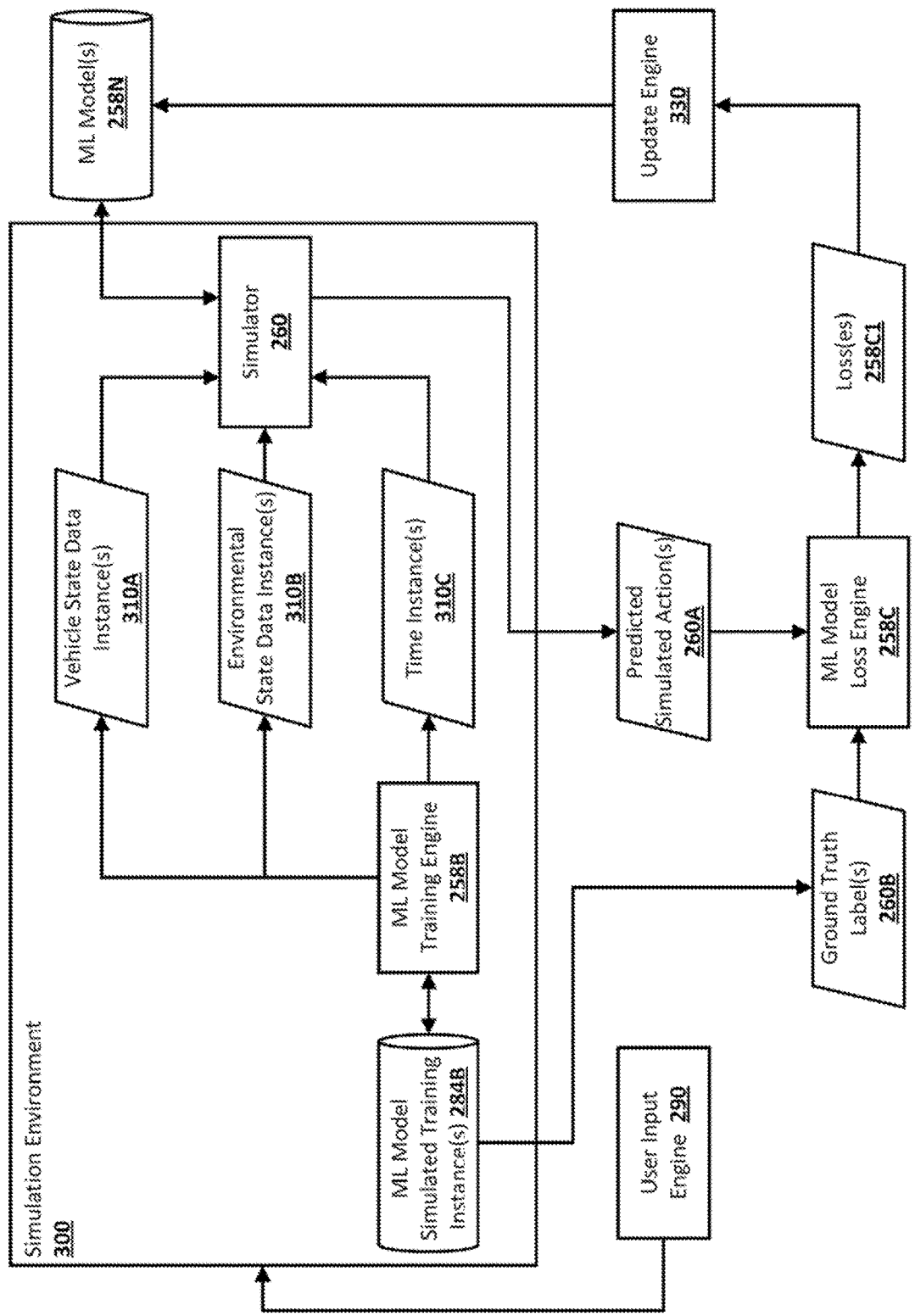
FIG. 3 is a block diagram illustrating an example simulation environment for updating a machine learning model that is used by a planning subsystem of an autonomous vehicle, in accordance with various implementations.

Turning now to FIG. 3, a block diagram illustrating an example simulation environment 300 for updating a ML model that is used by a planning subsystem (e.g., planning subsystem 158) of an autonomous vehicle (e.g., vehicle 100) is depicted. The simulation environment 300 includes at least the ML model training engine 258B and the simulator 260. As described above with respect to FIG. 2, the ML model training engine 258B can be utilized to configure the simulator 260 in the simulation environment 300 for simulated episodes of locomotion of a simulated AV. Further, user input, detected via the user input engine 290, can also be utilized in configuring the simulator 260 in the simulation environment 300. The simulation environment 300 can be implemented by one or more remote systems in communication over one or more networks (e.g., LAN, WAN, Internet, Wi-Fi, Bluetooth, etc.), or by multiple of the remote systems in a distributed manner. For example, one or more aspects may be implemented by a server, or a local computing device, to generate loss(es) 238C1, the loss(es) may be transmitted to an additional server to update the ML model at the additional server, and the simulator 260 may access the ML model at the additional server throughout the simulated episode of locomotion.

In some implementations, the ML model training engine 258B can randomly select a demonstrator state instance to be used in configuring the simulator 260. For example, the ML model training engine 258B can randomly select an demonstrator state instance from the ML model simulated training instance(s) database 284B, and the selected demonstrator state instance can be used by the ML model training engine 258B as an initial demonstrator state instance in configuring the simulator 260. In other implementations, the ML model training engine 258B can select a demonstrator state instance to be used in configuring the simulator 260 based on user input detected via the user input engine 290. For example, the user input detected via the user input engine 290 can identify a type of demonstrator state instance to be used in configuring the simulator 260, and the identified demonstrator state instance can be used by the ML model training engine 258B as an initial demonstrator state instance in configuring the simulator 260. In this example, the type of the demonstrator state instance can be based on the user input defining a particular action to be simulated in the simulation environment 300 (e.g., a merging action, a lane change action, a yielding action, a stopping action, and so on) without a particular demonstrator state instance being identified. As another example, the user input detected via the user input engine 290 can identify a particular demonstrator state instance to be used in configuring the simulator 260, and the identified demonstrator state instance can be used by the ML model training engine 258B as an initial demonstrator state instance in configuring the simulator 260. In this example, the particular demonstrator state instance can be based on the user input defining a particular demonstrator state instance to be simulated in the simulated environment (e.g., a particular demonstrator state instance that corresponds to the vehicle initiating a yielding action in response to a bicycle nudging around a parked vehicle).

Further, the ML model simulated training engine 284 can identify a plurality of subsequent demonstrator state instances stored in the ML model simulated training instance(s) database 284B. The subsequent demonstrator state instances can include the demonstrator state instances that are subsequent to the initial demonstrator state instance, and through completion of the action being performed by the vehicle in the initial demonstrator state instance. For example, assume the selected or identified initial demonstrator state instance corresponds to the vehicle initiating a merging action on a highway. In this example, the subsequent demonstrator state instances can include the N demonstrator state instances of the vehicle from immediately after the initial demonstrator state instance until the vehicle successfully completes the merging action, where N is a positive integer. Notably, one or more of the subsequent demonstrator state instances are stored in association with corresponding ground truth label(s) 260B that are indicative of a corresponding action performed at a corresponding time instance of the simulated episode of locomotion of the simulated AV.

As described herein, the initial demonstrator state instance can include an initial vehicle state data instance and an initial environmental state data instance. Prior to initiating the simulated episode of locomotion of the simulated AV, the simulator 260 can configure the simulation environment 300 based on the initial vehicle state data instance and the initial environmental state data instance. In particular, the simulator can configure the simulated AV based on the initial vehicle state data instance such that the simulated AV is a simulated version of the vehicle at the initial demonstrator state instance. For example, the simulated AV can be configured with the same pose information as the vehicle (e.g., with respect to the initial environmental state data instance), the same acceleration information as the vehicle, the same velocity information as the vehicle, the same state features as the vehicle (e.g., a decelerating state feature, an accelerating state feature, a constant velocity state feature, a blinking indicator state feature, a steering angel state feature, a merging state feature, a yielding state feature, or a lane change state feature, and so on). Further, the simulator can configure the simulated environment 300 to include environmental objects, and states thereof, based on the initial environmental state data instance such that the simulated environment is a simulated version of a real environment of the vehicle at the initial demonstrator state instance. For example, the simulated environment can be configured with the same vehicles, pedestrians, roads, crosswalks, traffic lights, traffic signs, buildings, and so on. Accordingly, the simulated AV in the simulated environment 300 can reflect that of the vehicle in the real environment in which the initial demonstrator state instance was generated. Moreover, the ML model training engine 258B can also utilize additional vehicle state data instances or additional environmental state data instances throughout the simulation (e.g., to advance other actors or environmental objects in a manner in which they were encountered). In some implementations, vehicle state data instance(s) 310A can include the initial and additional vehicle state data instances, and environmental state data instance(s) 310B can include the initial and additional environmental state data instances.

In various implementations, user input detected via the user input engine 290 can modify or alter one or more state features of the vehicle state data instance(s) 310A or the environmental state data instance(s) 310B prior to performing the simulated episode of locomotion of the simulated AV. For example, if the vehicle state data instance(s) 310A indicate that the simulated AV includes a decelerating state feature (e.g., for stopping at a yellow light), then the user input can modify the decelerating state feature of the simulated AV to indicate that the simulated AV has a constant velocity state feature or an accelerating state feature. By modifying or altering one or more of the state features of the vehicle state data instance(s) 310A for the simulated AV, the ML model (e.g., stored in ML model(s) database 258N) used to determine predicted simulated actions will learn to not rely too heavily on a past action (e.g., as indicated by the decelerating state feature) in predicting further simulated actions that should be performed by using the techniques described herein. Put another way, by modifying or altering the decelerating state feature to the constant velocity state feature or the accelerating state feature, the ML model will learn to predict further simulated actions to decelerate based on other state features of the vehicle state data instance(s) 310A or the environmental state data instance(s) 310B by using the techniques described herein, rather than simply decelerating because of the decelerating state feature in the vehicle state data instance(s) 310A.

Moreover, user input detected via the user input engine 290 can define a given time interval of the simulated episode of locomotion of the simulated AV. The given time interval may be based on a duration of time for the vehicle to perform the action corresponding to the initial demonstrator state instance and the subsequent state operation instances. For example, if the demonstrator state instances correspond to the vehicle initiating and completing a lane change action, then the given time interval defined by the user input may only be several seconds corresponding to when the lane change action is initiated (e.g., corresponding to the initial demonstrator state instance) through when the lane change action is performed and completed (e.g., corresponding to the subsequent demonstrator state instances). In contrast, if the demonstrator state instances correspond to the vehicle maintaining a lane along a highway then the given time interval defined by the user input may be several minutes corresponding to when the lane is entered by the vehicle (e.g., corresponding to the initial demonstrator state instance) through when the lane is exited by the vehicle (e.g., corresponding to the subsequent demonstrator state instances). The ML model training engine 258B can discretize the given time interval defined by the user into time instance(s) 310C. The user can optionally define the time instance(s) 310C along with the given time interval (e.g., every 0.1 seconds, 0.25 seconds, 0.5 seconds, and so on), or the ML model training engine 258B can utilize default time instances (e.g., a corresponding time instance for each subsequent demonstrator state instance). Moreover, although the simulated episodes of locomotion are described herein as being performed for a given time interval (e.g., several seconds to several minutes), it should be understood that the given time interval corresponds to real time, and that the simulated episode of locomotion can be performed in a fraction of the given time interval (e.g., milliseconds).

Once the ML model training engine 258B has configured the simulator 260 based on the initial demonstrator state instance (e.g., the vehicle state data instance(s) 310A and the environmental state data instance(s) 310B), and the given time interval (e.g., discretized into the time instances 310C), the simulator can initiate performance of the simulated episode of locomotion of the simulated AV. For example, upon initiating performance of the simulated episode of locomotion, the simulator 260 can process, using the ML model, and for a first time instance of the time instance(s) 310C, the initial demonstrator state instance (or the modified or altered initial demonstrator state instance) to determine a first predicted simulated action of predicted simulated action(s) 260A. The simulator 260 can implement the first predicted simulated action in the simulation environment 300 to generate one or more first subsequent simulated state instances. Notably, the one or more first subsequent simulated states temporally correspond to a first one of the subsequent demonstrator state instances. Accordingly, if the first predicted simulated action is the same as a corresponding action performed by the vehicle, then there should be little to no variance between the one or more first subsequent simulated states and the first one of the subsequent demonstrator state instances. However, if the first predicted simulated action is different from the corresponding action performed by the vehicle, then there will be variance between the one or more first subsequent simulated states instances and the first one of the subsequent demonstrator state instances. Further, the simulator 260 can process, using the ML model, and for a second time instance of the time instance(s) 310C, one or more of the first subsequent simulated state instances to determine a second predicted simulated action of the predicted simulated action(s) 260A. The simulator 260 can implement the second predicted simulated action in the simulation environment 300 to generate one or more second subsequent simulated state instances. This process of determining the predicted simulated action(s) 260A, and implementing the predicted simulated action(s) 260A to generate one or more of the subsequent simulated state operation instances can be repeated for one or more of the time instances of the given time interval to complete the simulated episode of locomotion of the simulated AV.

In some implementations, the simulator 260 may suspend the simulated episode, of locomotion of the simulated AV, after implementing one or more of the predicted simulated action(s) 260A to generate subsequent simulated state instance(s). In some versions of those implementations, the ML model loss engine 258C can update the ML model based on the predicted simulated action(s) 260A (e.g., where the predicted simulated actions are determined based on predicted measures as described above with respect to FIG. 2) or the subsequent simulated state instance(s) when the simulated episode is suspended. Continuing with the above example, the simulator 260 may suspend the simulated episode after implementing the first predicted simulated action for the first time instance to generate the first subsequent simulated state instance. The ML model loss engine 258C may compare the first predicted simulated action for the first time instance to one or more of the ground truth label(s) 260B that temporally corresponds to an action performed by the vehicle to generate loss(es) 258C1. For instance, assume the first predicted simulated action corresponds to the simulated AV not yielding, but a temporally corresponding ground truth label corresponds to the vehicle yielding, then the ML model loss engine 258C can generate the loss(es) 258C1 based on the comparison. Further, the ML model loss engine 258C may compare the first subsequent simulated state instance to a first subsequent demonstrator state instance that temporally corresponds to the action performed by the vehicle to generate the loss(es) 258C1. For instance, the ML model loss engine 258C can generate the loss(es) 258C1 based on the comparison of simulated pose information to corresponding demonstrator pose information, simulated acceleration information to corresponding demonstrator acceleration information, or simulated steering angles to demonstrator steering angles. Moreover, update engine 330 can utilize one or more of the loss(es) 258C1 to update the ML model (e.g., one or more weights thereof). For example, the update engine 330 can backpropagate the loss(es) 258C1 across the ML model to update one or more of the weights thereof, or otherwise update the ML model.

Subsequent to updating the ML model, the ML model training engine 258B can re-initialize the simulator 260 based on the initial demonstrator state instance, and resume the simulated episode. In resuming the simulated episode, the simulator 260 can process, using the ML model, the initial demonstrator state instance to determine an additional first predicted simulated action, implement the additional first predicted simulated action to generate an additional first subsequent simulated action, and suspend the simulated episode after implementing the additional first subsequent simulated action to generate the additional first subsequent simulated action. The ML model loss engine 258C can compare the additional first predicted simulated action to one or more of the ground truth label(s) 260B that temporally corresponds to an action performed by the vehicle to generate one or more of the loss(es) 258C1 or by comparing the additional first subsequent simulated action to the first subsequent demonstrator state instance to generate one or more of the loss(es) 258C1. Moreover, update engine 330 can utilize one or more of the loss(es) 258C1 to update the ML model (e.g., update one or more weights thereof). The ML model training engine 258B can continue (i) re-initializing the simulator 260 based on the initial demonstrator state instance until, advancing the simulated episode through the first time instance, and (ii) updating the ML model based on one or more of the loss(es) 258C1 until the simulated episode converges with the past episode at the first time instance. For example, the ML model training engine 258B can cause the simulator 260 to repeat the simulated episode through the first time instance until the simulated episode matches the past episode (e.g., the predicted action of the simulated AV matches the action of the vehicle or the first subsequent simulated state instance of the simulated AV matches the first subsequent demonstrator state instance of the vehicle).

Once the simulated episode has converged with the past episode for the first time instance, the ML model training engine 258B can again re-initialize the simulator 260 based on the initial demonstrator state instance. However, the simulator 260 may now advance the simulated AV not only through the first time instance, but may also advance the simulated AV through a second time instance prior to suspending the simulated episode to generate one or more of the loss(es) 258C1 and to update the ML model. For example, the simulator 260 can process, using the ML model, the initial demonstrator state instance to determine a first predicted simulated action, and implement the first predicted simulated action to generate a first subsequent simulated state instance at the first time instance. Further, and without suspending the simulated episode, the simulator 260 can then process, using the ML model, the first subsequent simulated state instance to determine a second predicted simulated action, and implement the second predicted simulated action to generate a second subsequent simulated state instance. At this point, the simulated episode may be suspended, and the ML model loss engine 258C1 can generate one or more of the loss(es) 258C1. In particular, the ML model loss engine 238C can generate one or more of the loss(es) 258C1 by comparing the first predicted simulated action to one or more of the ground truth label(s) 260B that temporally corresponds to an action performed by the vehicle at the first time instance, comparing the first subsequent simulated state instance to a first subsequent demonstrator state instance at the first time instance, comparing the second predicted simulated action to one or more of the ground truth label(s) 260B that temporally corresponds to an action performed by the vehicle at the second time instance, or comparing the second subsequent simulated state instance to a second subsequent demonstrator state instance at the second time instance. Moreover, update engine 330 can utilize one or more of the loss(es) 258C1 to update the ML model (e.g., update one or more weights thereof). The ML model training engine 258B can continue re-initializing the simulator 260 based on the initial demonstrator state instance until, advancing the simulated episode through the second time instance, and updating the ML model based on one or more of the loss(es) 258C1 until the simulated episode converges with the past episode at the second time instance.

Once the simulated episode has converged with the past episode for the second time instance, the ML model training engine 258B can again re-initialize the simulator 260 based on the initial demonstrator state instance. However, the simulator 260 may now advance the simulated AV not only through the second time instance, but may also advance the simulated AV through a third time instance prior to suspending the simulated episode to generate one or more of the loss(es) 258C1 and to update the ML model. This process can be repeated for one or more of the time instances of the simulated episode of locomotion of the simulated AV. In this manner, one or more weights of the ML model can be updated to represent a learned control policy for one or more of the time instances of the given time interval. By updating the ML model in this manner according to the forward simulation technique, the ML model may adjust or counter covariate shift in data when the ML model is used in the real world by an AV. Further, the techniques described herein also obviate the need for querying an active demonstrator (e.g., trusted human) during the simulated episode, thereby more efficiently updating the ML model described herein.

In some versions of those implementations, the simulator 260 can determine multiple predicted simulated actions based on processing the initial demonstrator state instance using the ML model. As described above with respect to FIG. 2, the output of the ML model can include corresponding probabilities that are associated with various actions. The simulator 260 may select multiple actions based on the corresponding probabilities as the predicted simulated action(s) 260A (e.g., using a weighted sampling technique) for a given time instance, and implement the multiple actions to generate corresponding subsequent simulated state instances for the given time instance. Accordingly, the ML model loss engine 258C can generate loss(es) 258C1 based on one or more of the multiple predicted simulated action(s) 260A for the given time instance or one or more of the corresponding subsequent simulated state instances for the given time instance, and the update engine 330 can update the ML model based on the loss(es) 258C1 for one or more of the multiple predicted simulated action(s) 260A for the given time instance or one or more of the corresponding subsequent simulated state instances for the given time instance. Notably, these loss(es) 258C1 can be generated in a similar manner described above with respect to determining and implementing only a single predicted simulated action. In this manner, the simulator 260 can perform multiple instances of the simulated episode, of locomotion of the simulated AV, in parallel. In various implementations, prior to updating the ML model based on one or more of the losses, the losses can be weighted. Weighting one or more of the losses is described in greater detail herein (e.g., with respect to FIG. 9).

In some additional or alternative implementations, the simulator 260 may perform and complete the simulated episode, of locomotion of the simulated AV, and optionally one or more additional simulated episodes, prior to generating any loss(es) 258C1. Continuing with the above example, the simulator 260 may determine, using the ML model, and for the first time instance, the first predicted simulated action based on processing the initial demonstrator state instance, and implement the first predicted simulated action to generate the first subsequent simulated state instance. Subsequent to generating the first subsequent simulated state instance, the simulator 260 can process, using the ML model, and for the second time instance, the first subsequent simulated state instance to determine the second predicted simulated action, and implement the second predicted simulated action to generate the second subsequent simulated state instance, and so on for one or more of the remaining time instances of the given time interval of the simulated episode, without suspending the simulated episode, and until the simulated episode is complete.

In some versions of those implementations, and upon completion of the simulated episode, of locomotion of the simulated AV, the ML model loss engine 258C may then generate the loss(es) 258C1 by comparing the predicted simulated action(s) 260A to one or more of the corresponding ground truth label(s) 260B in a similar manner described above or by comparing the subsequent simulated state instances to corresponding subsequent demonstrator state instances in a similar manner described above. Further, the update engine 330 can update the ML model based on the loss(es) 258C1. The ML model training engine 258B can then re-initialize the simulator 260 based on the same initial demonstrator state instance, or a distinct initial state demonstrator instance, and perform another simulated episode of locomotion in a similar manner. In some additional or alternative versions of those implementations, and upon completion of the simulated episode, of locomotion of the simulated AV, the ML model loss engine 258C can generate one or more of the loss(es) 258C1. However, prior to the update engine 330 updating the ML model based on the loss(es) 268C1, the ML model training engine 258B can re-initialize the simulator 260 based on the same initial demonstrator state instance, and perform an additional simulated episode of locomotion. The ML model loss engine 258C1 can then generate one or more additional loss(es) 258C1 based on the additional episode of locomotion in a similar manner described above. The ML model training engine 258B can continue re-initializing further simulated episodes of locomotion for a threshold quantity of simulated episodes (e.g., 20, 50, 100), and the ML model loss engine 258C1 can continue generating further loss(es) 258C1. In response to performing the threshold quantity of simulated episodes, the ML model loss engine 258C can aggregate the loss(es) 258C1 for one or more of the simulated episodes, and the update engine 330 can update the ML model based on the aggregated loss(es) 258C1. Notably, the additional simulated episodes, of locomotion of the simulated AV, may be performed in either a parallel or serialized manner. In various implementations, prior to updating the ML model based on one or more of the losses, the losses can be weighted. Weighting one or more of the losses is described in greater detail herein (e.g., with respect to FIG. 9).

In various implementations, the simulator 260 may also implement actions of any other vehicle(s), pedestrian(s), animal(s), or any other dynamic object(s) when one or more of the predicted simulated action(s) 260A are implemented. In some versions of those implementations, the actions of one or more of the other dynamic object(s) may be implemented in a manner consistent with the subsequent demonstrator state instances. For example, if the initial demonstrator state instance corresponds to the vehicle merging onto a highway, and there is a first vehicle in front of the vehicle in a lane of traffic in which the vehicle is merging and a second vehicle behind the vehicle in the lane of traffic in which the vehicle is merging, then the first vehicle and the second vehicle can be advanced through the simulated episode, at one or more of the time instances, according to pose information, velocity information, acceleration information, or other information included in the subsequent demonstrator state instances (or the environmental state instances thereof). In other words, the first vehicle and the second vehicle can be simulated in a manner that reflects how they were encountered when the subsequent demonstrator state instances were generated. As another example, if the subsequent demonstrator state instances include a traffic light transition from a green state, to a yellow state, and then to a red state, then a simulated traffic light can transition consistent with the subsequent demonstrator state instances.

In some additional or alternative versions of those implementations, the actions of one or more of the other dynamic object(s) may be implemented in other manners. For example, one or more (e.g., all) objects that are dynamic objects may, despite actually moving in the subsequent demonstrator state instances, be kept static in subsequent simulated state instances (i.e., kept in their state in the initial state instance). As another example, one or more (e.g., all) objects that are dynamic objects can be progressed, in subsequent simulated state instances, in a manner that is different from their progression in the subsequent demonstrator state instances. For instance, one or more of the dynamic objects can be progressed pursuant to a defined policy, such as a policy that is specific to a type of the object. For instance, the policy can be a probability distribution of potential action(s), and one of the actions selected, at one or more iterations, based on the probability distribution. In other instances, one or more can be progressed in a random (truly random or pseudo-random) manner.

Turning now to FIGS. 4A and 4B, an example simulated episode, of locomotion of a simulated AV 400, performed in the simulation environment of FIG. 3, and a corresponding timeline 490B of demonstrator actions and demonstrator state instances, and corresponding predicted simulated actions and corresponding simulated state instances is depicted. As shown in FIG. 4A, there are three past episodes 410A, 410B, 410C that correspond to a vehicle initiating and performing a U-turn action. At $T_0$, the ML model can be initially trained based on demonstrator state instances that correspond to the three past episodes 410A, 410B, 410C (and optionally additional past episodes) to bootstrap the ML model via behavior cloning as described in detail above with respect to FIGS. 2 and 5. Moreover, prior to performing the simulated episode, the simulated AV 400 can be configured based on an initial demonstrator state instance, of one of the three past episodes 410A, 410B, 410C, as described in detail above with respect to FIG. 3. Notably, each of the three past episodes 410A, 410B, 410C correspond to a vehicle initiating and performing the same U-turn action, and an initial vehicle state data instance for each of the initial demonstrator state instance of the three past episodes 410A, 410B, 410C will be substantially similar. However, subsequent demonstrator state instances for the three past episodes will vary as indicated by variation in the three past episodes 410A, 410B, 410C after $T_0$ as shown in FIG. 4A. Moreover, as shown in FIG. 4A, two simulated episodes 420A, 420B are depicted in FIG. 4A.

For the sake of example, FIGS. 4A and 4B will be described with respect to performing a first simulated episode 420A that is based on a first past episode 410A, and that is performed using a forward simulation technique. However, it should be understood that is not meant to be limiting and that the two simulated episodes 420A, 420B can be performed in a parallel or serialized manner. Also for the sake of example, only a portion of the U-turn action is depicted in FIG. 4A, and the portion of the U-turn action is discretized into various time instances $T_0$-$T_4$. However, it should be understood that this is for a given time interval associated with the simulated episode 410A. Further, as shown in FIGS. 4B, each of the demonstrator state instances are associated with ground truth labels corresponding to demonstrator actions of decelerate for each of the time instances $T_0$-$T_N$ to indicate the vehicle decelerated throughout the U-turn action, and are also associated with a corresponding vehicle state data instance (represented by the feature vector $[VF_{01}, \ldots, VF_{0N}]$) and a corresponding environmental state data instance (represented by the feature vector $[EF_{01}, \ldots, EF_{0N}]$). $[VF_{01}, \ldots, VF_{0N}]$). With respect to the feature vectors described herein, "0" in the subscript of "01" corresponds to the time instance T0, and where the "1" in the subscript of "01" corresponds to a first vehicle feature or first environmental feature of N features, and N is a positive integer. Although the ground truth labels corresponding to the demonstrator actions depicted in FIG. 4B correspond to demonstrator actions of decelerate for the time instances, it should be understood that is for the sake of example and is not meant to be limiting. For example, ground truth labels can be, for example, slow down, U-turn, or some other indication of an action that the simulated AV 400 should perform for a given time instance, and may also include a magnitude component or steering angle component.

As described in detail above with respect to FIG. 3, a simulator can be configured based on an initial demonstrator state instance. Put another way, at $T_0$, an initial simulated state instance should match the initial demonstrator state instance, which is indicated by the initial simulated state instance in the timeline 490B of FIG. 4B having the same action of decelerate, and the same vehicle state data instance (e.g., as indicated by the feature vector $[VF_{01}, \ldots, VF_{0N}]$) and the same environmental state data instances (e.g., as indicated by the feature vector $[EF_{01}, \ldots, EF_{0N}]$) as the initial demonstrator state instance (e.g., no annotation of "S" for simulated state instances). Once initialized based on the initial demonstrator state instance, the simulator can process, using the ML model, the initial demonstrator instance of the first past episode 410A at $T_0$ to determine a first predicted simulated action of accelerate as shown at $T_1$ in the timeline 490B of FIG. 4B, and implement the first predicted simulated action to generate a first subsequent simulated state instance. Subsequent to generating the first subsequent simulated state instance, the simulator can suspend the first simulated episode 420A to generate one or more losses based on the first predicted simulated action or the first subsequent simulated state instance. For example, the one or more losses can be generated based on comparing the ground truth label of decelerate at $T_1$ to the predicted simulated action of accelerate, or comparing a first subsequent demonstrator state instance (e.g., represented by the feature vectors [$VF_{11}, \ldots, VF_{1N}$] and [$EF_{11}, \ldots, EF_{1N}$]) to the first subsequent simulated state instance (e.g., represented by the feature vectors [$SVF_{11}, \ldots, SVF_{1N}$] and [$SEF_{11}, \ldots, SEF_{1N}$]). The one or more generated losses can be utilized to update the ML model, e.g. update one or more weights thereof.

The first subsequent simulated state instance can be the resulting state of the simulated AV 400 depicted by the dashed line at $T_1$. Notably, the first subsequent simulated state instance depicted at $T_1$ differs from a first subsequent demonstrator state instance depicted at $T_1$, as indicated by the solid line of first simulated episode 420A, since the simulated AV 400 takes a wider U-turn than the first past episode 410A due to implementing the first predicted simulated action (e.g., accelerating) of the simulated AV 400, rather than an actual action of the vehicle for the first past episode 410A (e.g., decelerating). Assuming that the simulated episode has not converged with the past episode at the first time instance (e.g., as shown at $T_1$ in FIG. 4A), the simulator can be re-initialized based on the initial demonstrator state instance, and the above process can be repeated through the first time instance $T_1$ until the simulated episode converges with the past episode (e.g., one or more of the losses are within a threshold error rate). However, assuming that the simulated episode has converged with the past episode at the first time instance, the simulator can be re-initialized based on the initial demonstrator state instance, and the above process can be repeated. However, rather than suspending the simulated episode at $T_1$, the simulator will advance the simulated episode through a second time instance $T_2$ as well. For example, continuing with the above example, the simulator can process, using the ML model, the first subsequent simulated state instance to determine a second predicted simulated action of accelerate as shown at $T_2$ in the timeline 490B of FIG. 4B. Subsequent to generating the first subsequent simulated state instance, the simulator can suspend the first simulated episode 420A to generate one or more losses based on the first predicted simulated action, the first subsequent simulated state instance, the second predicted simulated action, or the second subsequent simulated state instance.

For example, the one or more losses can be generated based on comparing the ground truth label of decelerate at $T_1$ to the predicted simulated action of accelerate for this iteration of the simulated episode 420A, comparing a first subsequent demonstrator state instance (e.g., represented by the feature vectors [$VF_{11}, \ldots, VF_{1N}$] and [$EF_{11}, \ldots, EF_{1N}$]) to the first subsequent simulated state instance (e.g., represented by the feature vectors [$SVF_{11}, \ldots, SVF_{1N}$] and [$SEF_{11}, \ldots, SEF_{1N}$]) for this iteration of the simulated episode 420A, comparing the ground truth label of decelerate at $T_2$ to the predicted simulated action of accelerate for this iteration of the simulated episode, or comparing a second subsequent demonstrator state instance (e.g., represented by the feature vectors [$VF_{21}, \ldots, VF_{2N}$] and [$EF_{21}, \ldots, EF_{2N}$]) to the second subsequent simulated state instance (e.g., represented by the feature vectors [$SVF_{21}, \ldots, SVF_{2N}$] and [$SEF_{21}, \ldots, SEF_{2N}$]) for this iteration of the simulated episode 420A. Notably, the simulated episode 420A has already converged with the past episode at the first time instance $T_1$, so the losses generated at the first time instance $T_1$ should be relatively small compared to the losses generated at the second time instance $T_2$. Nonetheless, the losses generated at the first time instance $T_1$ can also be considered in generating the losses, and the one or more generated losses can be utilized to update the ML model, e.g. update one or more weights thereof.

This process of re-initializing the simulator, advancing the simulated episode 420A to a given time instance subsequent to a time instance where the simulated episode 420A and the past episode converged, generating losses based on that iteration of the simulated episode, updating the ML model based on the losses, and re-initializing the simulator to again advance the simulated episode 420A to the given time instance can be repeated for one or more of the time instances of the given time interval of the simulated episode 420A, until the simulated episode 420A converges with the past episode. In various implementations, prior to updating the ML model based on one or more of the losses, the losses can be weighted. Weighting one or more of the losses is described in greater detail herein (e.g., with respect to FIG. 9).

Turning now to FIGS. 4C and 4D, another example simulated episode, of locomotion of a simulated AV 400, performed in the simulation environment of FIG. 3, and a corresponding timeline 490D of demonstrator actions and predicted simulated actions is depicted. As shown in FIG. 4, there is a past episode 430 that corresponds to a vehicle driving along a track. At $T_0$, the ML model can be initially trained based on demonstrator state instances that correspond to the past episodes 430 (and optionally additional past episodes) to bootstrap the ML model via behavior cloning as described in detail above with respect to FIGS. 2 and 5. Moreover, prior to performing the simulated episode, the simulated AV 400 can be configured based on an initial demonstrator state instance of one of the past episode 430 as described in detail above with respect to FIG. 3. For the sake of example, FIGS. 4C and 4D will be described with respect to performing a first simulated episode 440A and a second simulated episode 440B that are based on the past episode 430, and that are performed using an iterative simulation technique. However, it should be understood that is not meant to be limiting and that multiple additional simulated episodes can be performed in a parallel or serialized manner prior to updating the ML model. Also for the sake of example, the simulated episode 440 is discretized into various time instances $T_0$-$T_4$. However, it should be understood that this is for a given time interval associated with the simulated episode 440.

Further, as shown in FIG. 4D, the demonstrator state instances are associated with various ground truth labels corresponding to demonstrator actions for the time instances $T_0$-$T_N$ to indicate actions of the vehicle progressing through the track, and are associated with a corresponding vehicle state data instance (e.g., represented by the feature vector [$VF_{01}, \ldots, VF_{0N}$]) and a corresponding environmental state data instance (e.g., represented by the feature vector [$EF_{01}, \ldots, EF_{0N}$]). [$VF_{01}, \ldots, VF_{0N}$]). With respect to the feature vectors described herein, "0" in the subscript of "01" corresponds to the time instance TO, and where the "1" in the subscript of "01" corresponds to a first vehicle feature or first environmental feature of N features, and N is a positive integer. Although the ground truth labels corresponding to the demonstrator actions depicted in FIG. 4D correspond to various demonstrator actions of accelerate or decelerate for the time instances, it should be understood that is for the sake of example and is not meant to be limiting. For example, ground truth labels can be, for example, slow down, speed up, turn right, turn left, or some other indication of an action that the simulated AV 400 should perform for a given time instance. Moreover, although FIGS. 4C and 4D are described herein as generating one or more of the losses based on comparing the ground truth labels corresponding to the demonstrator actions and the predicted simulated actions, it should be understood that is for the sake of example and is not meant to be limiting. For example, the ground truth labels corresponding to the demonstrator actions may also include a magnitude component or steering angle component.

As described in detail above with respect to FIG. 3, a simulator can be configured based on an initial demonstrator state instance. Put another way, at $T_0$, an initial simulated state instance should match the initial demonstrator state instance, which is indicated by the initial simulated state instance in the timeline 490B of FIG. 4B having the same action of decelerate, and the same vehicle state data instance (e.g., as indicated by the feature vector $[VF_{01}, \ldots, VF_{0N}]$) and the same environmental state data instances (e.g., as indicated by the feature vector $[EF_{01}, \ldots, EF_{0N}]$) as the initial demonstrator state instance (e.g., no annotation of "S" for simulated state instances). Once initialized based on the initial demonstrator state instance, the simulator can process, using the ML model, the initial demonstrator instance of the first past episode 410A at $T_0$ to determine a first predicted simulated action of accelerate as shown at $T_1$ in the timeline 490D of FIG. 4D, and implement the first predicted simulated action to generate a first subsequent simulated state instance (e.g., represented by the feature vectors $[SVF_{11}, \ldots, SVF_{1N}]$ and $[SEF_{11}, \ldots, SEF_{1N}]$). Notably, the first subsequent simulated state instance depicted at $T_1$ differs from a first subsequent demonstrator state instance depicted at $T_1$ as indicated by the first simulated episode 440A taking a wider turn than the past episode 430 despite implementing the first predicted simulated action (e.g., accelerating) of the simulated AV 400, that reflects a first action of the vehicle for the first past episode 430. Although the first predicted simulated action corresponds to the first demonstrator action (e.g., as indicated by the column at $T_1$), this may be a result of the predicted simulated action being determined with an incorrect magnitude component or steering angle component. Moreover, in contrast with the forward simulation approach of FIGS. 4A and 4B, and subsequent to generating the first subsequent simulated state instance, the simulator can process, using the ML model, to determine a second predicted simulated action (e.g., decelerate at $T_2$ in the timeline 490D of FIG. 4D). Further, the simulator can implement the second predicted simulated action to generate a second subsequent simulated state instance (e.g., represented by the feature vectors $[SVF_{21}, \ldots, SVF_{2N}]$ and $[SEF_{21}, \ldots, SEF_{2N}]$). This process can be repeated for one or more of the remaining time instances of the given time interval of the first simulated episode 440A without suspending the simulation to generate any losses.

Subsequent to completing the first simulated episode 440A, one or more losses for the first simulated episode 440A can be generated in a similar manner described above with respect to FIGS. 4A and 4B (e.g., by comparing the corresponding ground truth labels to the predicted simulated actions for one or more of the time instances or by comparing corresponding demonstrator state instances to the subsequent simulated state instances). However, the ML model may not be immediately updated based on one or more of the generated losses. Rather, the simulator may simulate at least the second simulated episode of locomotion 440B based on the same initial demonstrator state instance in a similar manner described with respect to the first simulated episode of locomotion 440B. Subsequent to completing the second simulated episode 440B, one or more additional losses for the second simulated episode 440B can be generated in a similar manner described above with respect to FIGS. 4A and 4B. The losses for at least the first simulated episode 440A and the second simulated episode 440B can be aggregated, and the aggregated loss can be utilized to update the ML model. In various implementations, prior to updating the ML model based on one or more of the losses, the losses can be weighted. Weighting one or more of the losses is described in greater detail herein (e.g., with respect to FIG. 9).

Figure 5:
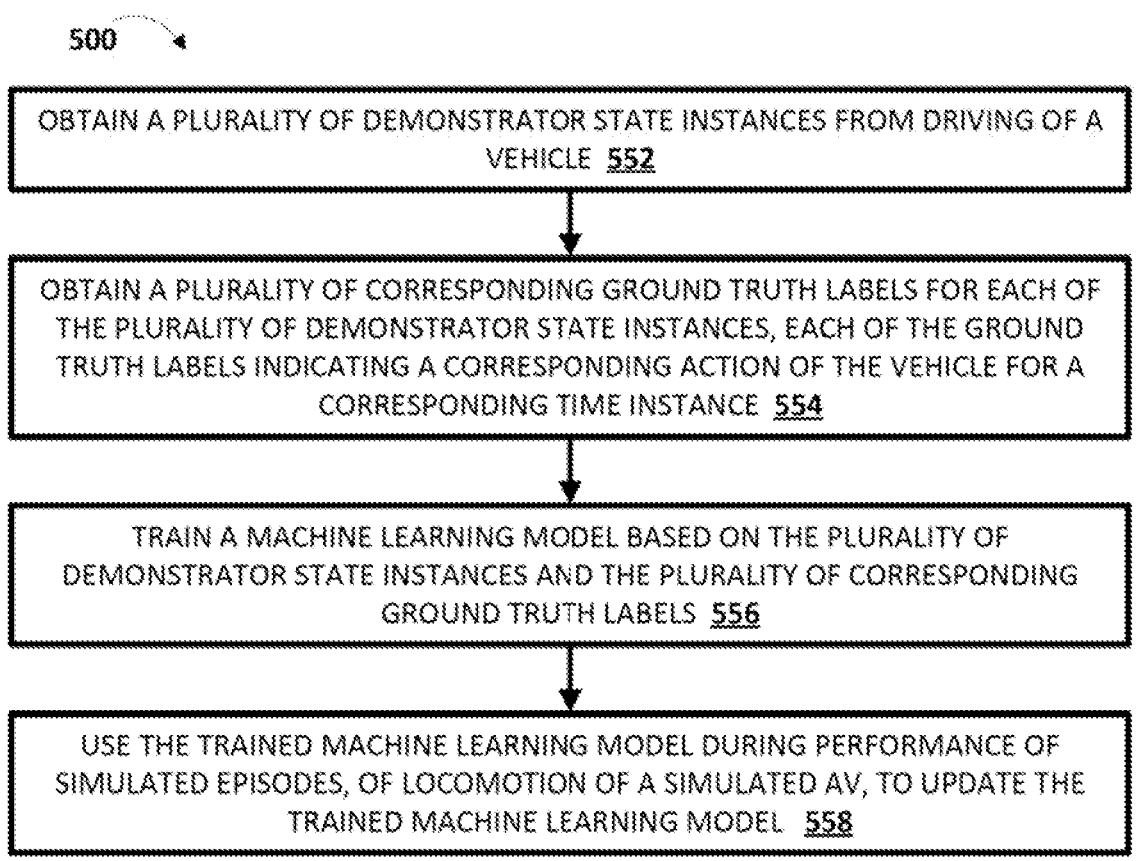
FIG. 5 is a flowchart illustrating an example method of training a machine learning model that is utilized by a simulated environment to update the machine learning model, in accordance with various implementations.

Turning now to FIG. 5, an example method 500 of training a ML model that is utilized by a simulated environment to update the ML model is depicted. For convenience, the operations of the method 500 are described with reference to a system that performs the operations. The system may include various components of various devices, including those described in FIGS. 1-3, server(s), local computing device(s) (e.g., laptop, desktop computer, and so on), other computing systems having memory and processors, or any combination thereof. Moreover, while operations of the method 500 are shown in a particular order, this is not meant to be limiting. One or more operations, elements, or steps may be reordered, omitted, or added.

At block 552, the system obtains a plurality of demonstrator state instances from driving of a vehicle. The demonstrator state instances can include a vehicle state data instance or environmental state data instance. The vehicle state data instance can include features of the vehicle at a plurality of corresponding time instances, and the environmental state data instance can include features of an environment in which the vehicle is navigating. Further, the demonstrator state instances can be generated during manual driving of an autonomous vehicle, autonomous driving of an autonomous vehicle, manual driving of a non-autonomous vehicle that is retrofitted with one or more sensors (e.g., one or more of primary sensors 130 of vehicle 100 of FIG. 1), manual driving of a simulated vehicle, defined by a trusted human, or based on annotations of any of the above by a trusted human.

At block 554, the system obtains a plurality of corresponding ground truth labels for each of the plurality of demonstrator state instances, each of the ground truth labels indicating a corresponding action of the vehicle for a corresponding time instance. The plurality of demonstrator state instances can be associated with one or more of the ground truth labels. For instance, if a given one of the demonstrator state instances corresponds to an action of the vehicle initiating a stop in response to a traffic light transitioning from a green light to a yellow light, then one or more of the corresponding ground truth labels can be stopping, decelerating, stop for yellow light, and so on. As another example, if a given one of the demonstrator state instances corresponds to an action of the vehicle merging onto a highway, then one or more of the corresponding ground truth labels can be merging, accelerating, changing lanes, and so on.

At block 556, the system trains a ML model based on the plurality of demonstrator state instances and the plurality of corresponding ground truth labels. For example, the system can train the ML model by applying one or more of the plurality of demonstrator state instances as input across the ML model to generate corresponding predicted measures as described in detail above with respect to FIG. 2. Further, the system can compare the corresponding predicted measures to one or more of the corresponding ground truth labels to generate losses. Moreover, the system can update the ML model by, for example, backpropagating the losses across the ML model.

At block 558, the system uses the trained ML model during performance of simulated episodes of location of a simulated AV to update the trained ML model. In this manner, the ML model can be bootstrapped, via behavior cloning, prior to the ML model being utilized in a simulated environment. As a result, the ML model is simply updated in the simulated environment rather than being trained from scratch.

Figure 6:
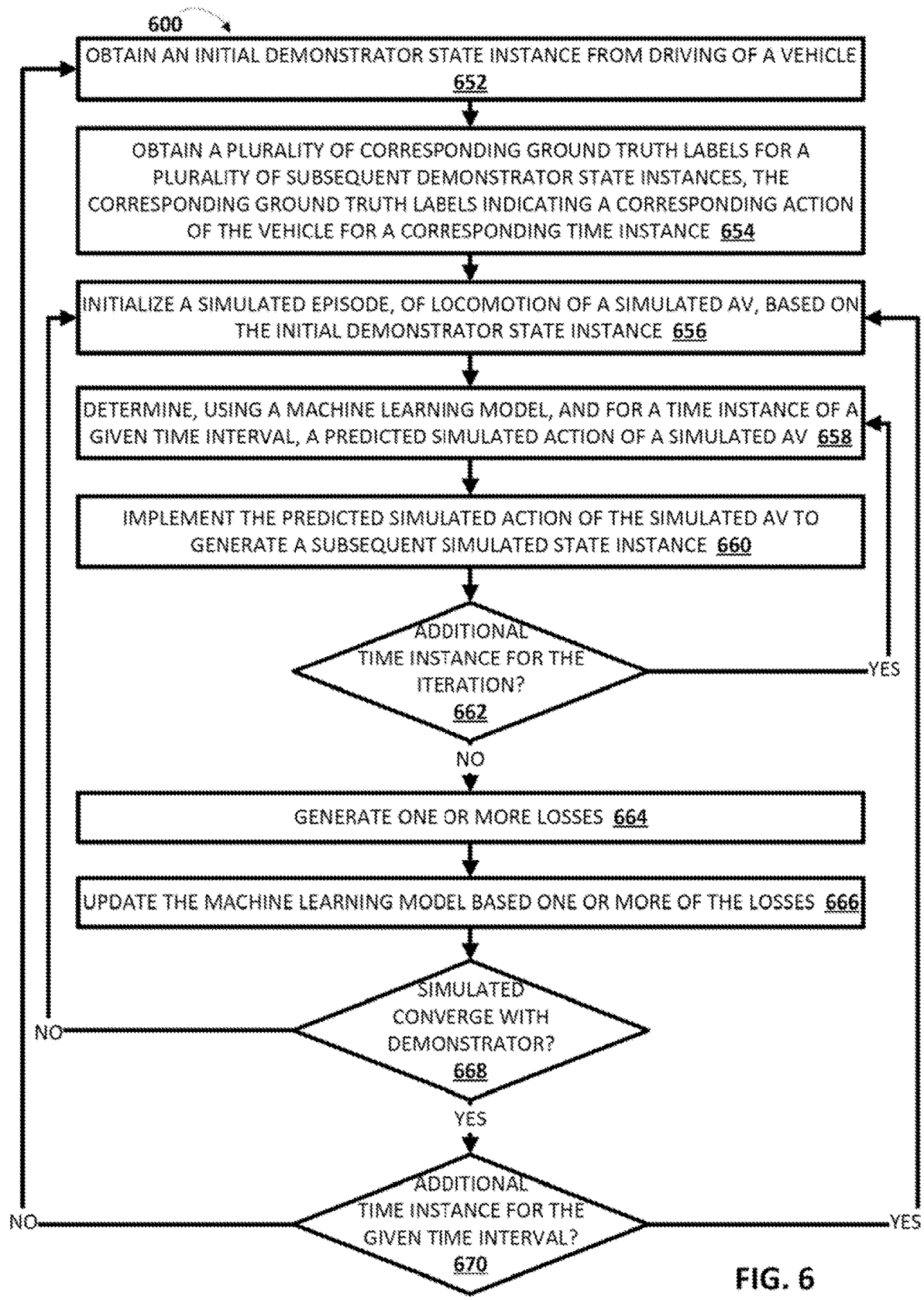
FIG. 6 is a flowchart illustrating an example method of updating the machine learning model of FIG. 5 based on a forward simulation technique, in accordance with various implementations.

Turning now to FIG. 6, an example method 600 of updating the ML model of FIG. 5 based on a forward simulation technique is depicted. For convenience, the operations of the method 600 are described with reference to a system that performs the operations. The system may include various components of various devices, including those described in FIGS. 1-3, server(s), local computing device(s) (e.g., laptop, desktop computer, and so on), other computing systems having memory and processors, or any combination thereof. Moreover, while operations of the method 600 are shown in a particular order, this is not meant to be limiting. One or more operations, elements, or steps may be reordered, omitted, or added.

At block 652, the system obtains an initial demonstrator state instance from driving of a vehicle. As noted above with respect to block 552 of FIG. 5, a demonstrator state instance can include a vehicle state data instance or environmental state data instance. The vehicle state data instance can include features of the vehicle at a plurality of corresponding time instances, and the environmental state data instance can include features of an environment in which the vehicle is navigating. Further, the demonstrator state instance can be generated during manual driving of an autonomous vehicle, autonomous driving of an autonomous vehicle, manual driving of a non-autonomous vehicle that is retrofitted with one or more sensors (e.g., one or more of primary sensors 130 of vehicle 100 of FIG. 1), manual driving of a simulated vehicle, defined by a trusted human, or based on annotations of any of the above by a trusted human. More particularly, the initial demonstrator state instance is a given demonstrator state instance from which a simulated episode of locomotion is initialized, and generally corresponds to an demonstrator state instance in which an action of the vehicle is initiated (e.g., initiating a merging action, a yielding action, a lane change action, and so on), but can correspond to any demonstrator state instance. In various implementations, the initial demonstrator state instance can be selected by a user via user input.

At block 654, the system obtains a plurality of corresponding ground truth labels for a plurality of subsequent demonstrator state instances, the corresponding ground truth labels indicating a corresponding action of the vehicle for a corresponding time instance. The subsequent demonstrator state instances can include any demonstrator state instance that is generated subsequent to the initial demonstrator state instance obtained at block 652, and generally correspond to demonstrator state instances through which an action of the vehicle is performed and completed (e.g., performing and completing the merging action, the yielding action, the lane change action, and so on), but can correspond to any demonstrator state instance beyond completion of the action. The plurality of subsequent demonstrator state instances can be associated with one or more of the corresponding ground truth labels. For instance, if a given one of the subsequent demonstrator state instances corresponds to an action of the vehicle initiating a stop in response to a traffic light transitioning from a green light to a yellow light, then one or more of the corresponding ground truth labels can be stopping, decelerating, stop for yellow light, and so on.

At block 656, the system initializes a simulated episode, of locomotion of a simulated autonomous vehicle ("AV"), based on the initial demonstrator state instance. In particular, the system can configure a simulator to include a simulated AV having features that correspond to those of the vehicle state data instance of the initial demonstrator state instance. For instance, the simulated AV can have a simulated pose instance, simulated velocity information, simulated acceleration information, an indication that the simulated AV is braking, and so on that matches those included in the vehicle state data instance. Further, the system can configure the simulator to include an environment having features that correspond to those of the environmental state data instance of the initial demonstrator state instance. For instance, the environment of the simulator, in which the simulated episode of locomotion is performed, can include additional vehicles and associated state data, pedestrians and associated state data, traffic lights and associated state data, roads, buildings, or any other feature included in the environmental state data instance of the initial demonstrator state instance.

At block 658, the system determines, using a ML model, and for a time instance of a given time interval, a predicted simulated action of the simulated AV. In some implementations, the system can process, using the ML model, the initial demonstrator state instance to generate predicted measures based on the initial demonstrator state instance. For example, the system can generate corresponding probabilities as the predicted measures that correspond to a plurality of predicted actions for the time instance. For instance, assume that the initial demonstrator state instance corresponds to the vehicle just prior to initiating a yield for a pedestrian at a crosswalk. In this example, the system can process the vehicle state data instance that indicates at least the simulated AV is moving at a constant velocity, and the environmental state data instance that indicates the pedestrian has entered the crosswalk. Based on processing these data instances, using the ML model, the system can generate predicted measures of [0.4, 0.3, 0.3] corresponding to actions of [constant velocity, accelerate, decelerate], and can determine the predicted simulated action of constant velocity based on the predicted measures. In some additional or alternative implementations, the system can process, using the ML model, the initial demonstrator state instance and one or more candidate actions to generate predicted measures based on the initial demonstrator state instance. Continuing with the above example, the system can process the vehicle state data instance that indicates at least the simulate AV is moving at a constant velocity, the environmental state data instance that indicates the pedestrian has entered the crosswalk, and various candidate simulated actions, such as constant velocity, accelerate, and decelerate. Based on processing one or more of these data instances, using the ML model, the system can generate predicted measures of [constant velocity, 0.4], [accelerate, 0.3], and [decelerate, 0.3], and can determine the predicted simulated action of constant velocity based on the predicted measures.

Moreover, in various implementations, the given time interval of the simulated episode of locomotion can be defined by a user via user input. The given time interval can be based on an action being performed by the vehicle in the initial demonstrator state instance, and can be discretized into a plurality of disparate time instances. For instance, if the action included in the initial demonstrator state instance corresponds to the vehicle initiating a stop in response to detecting a traffic light transitioning from a green light to a yellow light, then the given time interval may be eight seconds. In contrast, if the action included in the initial demonstrator state instance corresponds to the vehicle yielding in response to a pedestrian jaywalking, then the given time interval may be 25 seconds. Notably, although the given time interval may be several seconds, it should be understood that the simulated episode of locomotion may be initiated and performed in a fraction of the given time interval (e.g., milliseconds).

At block 660, the system implements the predicted simulated action of the simulated AV to generate a subsequent simulated state instance. In particular, the system can advance the simulation in accordance with the predicted simulated action determined at block 660 of FIG. 6. Further, the system can advance other actors included in the initial demonstrator state instance in accordance with how the other actors were encountered in the real world or in accordance with other policies. Continuing with the above example, assume that the system determines the predicted simulated action indicates that the simulated AV should maintain a constant velocity even though the pedestrian has entered the crosswalk, but the driving of the vehicle indicates that the simulated AV should have initiated braking. In this example, the subsequent simulated state operation instance that immediately follows the initial demonstrator state instance in the simulated episode will differ from a corresponding subsequent demonstrator state instance that immediately follows the initial demonstrator state instance from the driving of the vehicle. This difference is due to the difference of the predicted simulated action of the simulated AV (e.g., maintain a constant velocity) and an actual action of vehicle during the driving (e.g., decelerate), and may indicate that the simulated AV is closer to the crosswalk where the pedestrian is crossing than the vehicle was during the driving at a corresponding time instance.

At block 662, the system determines whether there is an additional time instance for the iteration of the simulated episode. As described above with respect to FIGS. 3, 4A, and 4B, and below with respect to block 668, the system may determine, for a first time instance of the given time interval, a first predicted simulated action, and implement the first predicted action to generate a first subsequent simulated state instance for multiple iterations of the simulated episode, until an iteration of the simulated episode, for the first time instance of the given time interval, converges with the past episode on which the simulated episode is generated. Put another way, the system can perform multiple iterations of the simulated episode until the first subsequent simulated state instance converges with a corresponding first subsequent demonstrator state instance. If, at an iteration of block 662, the system determines that there is no additional time instance for the iteration, then the system may proceed to block 664.

At block 664, the system generates one or more losses. The system can generate one or more of the losses according to method 800 of FIG. 8 as described in detail below. Further, one or more of the losses can optionally be weighted according to method 900 of FIG. 9 as described in detail below. At block 666, the system updates the ML model based on one or more of the losses generated according to the method 800 of FIG. 8, and optionally one or more weighted losses based on the method 900 of FIG. 9. For example, the system can update the ML model by back-propagating one or more of the losses (or one or more weighted losses) across the ML model to update weights of the ML model.

At block 668, the system determines whether the subsequent simulated state instance has converged with a corresponding demonstrator state instance for the time instance. The system can determine whether the subsequent simulated state instance has converged with a corresponding demonstrator state instance based on whether one or more of the losses generated at block 664 is zero, or within a threshold error rate. Put another way, the system determines whether the ML model has predicted a simulated action that reflects an action taken by the demonstrator in the demonstrator episode, and, as a result, the subsequent simulated instance is identical to, or nearly identical to, a corresponding subsequent demonstrator state instance. If, at an iteration of block 668, the system determines that the simulated episode has not converged with the demonstrator episode, then the system returns to block 656 to re-initialize the simulated episode based on the initial demonstrator state instance, and continues with the method 600 to further update the ML model for the time instance in the same manner described above. It is noted that the simulated action determined at each subsequent iteration of block 658, and implemented at block 660, can vary from that determined in prior iteration(s) of block 660 due to the ML model being updated (at block 666) between iterations of the simulated episode. This process can be repeated until the simulated episode converges with the demonstrator episode for the time instance. If, at an iteration of block 668, the system determines that the simulated episode has converged with the demonstrator episode, then the system proceeds to block 670.

At block 670, the system determines whether there is an additional time instance for the given time interval. If, at an iteration of block 670, the system determines there is an additional time instance for the given time interval, then the system returns to block 656 to re-initialize the simulated episode based on the initial demonstrator state instance. However, in contrast with returning to block 656 from block 668, the system advances the simulated AV through the time instance and an additional time instance for those iterations of the simulated episode, rather than just the time instance as is the prior iterations of the simulated episode. Accordingly, at a subsequent iteration of block 658, the system determines, using the ML model, a predicted simulated action for the time instance (e.g., the same predicted simulated action from an iteration immediately prior to convergence or a different simulated predicted action determined at the subsequent iteration of block 660) based on processing the initial demonstrator state instance, and, at a subsequent iteration of block 662, the system implements the predicted simulated action for the time instance to generate a subsequent simulated state instance. Notably, at this subsequent iteration of block 662, the system will determine there is an additional time instance for the iteration, and the system will return to block 658 to determine, using the ML model, and for the additional time instance of the given time interval, an additional predicted simulated action of the simulated AV based on processing the subsequent simulated state instance. Further, at this subsequent iteration of block 660, the system will implement the additional predicted simulated action to generate an additional subsequent simulated state instance. This process can be repeated one or more of the time instances of the iteration of the simulated episode.

For the sake of example, assume that there are no additional time instances for the iteration at block 662, and the system proceeds to block 664. At this subsequent iteration of block 664, the system may then generate one or more losses based on the method 800 of FIG. 8 or the method 900 of FIG. 9, and update the ML model based on one or more of the losses at a subsequent iteration of block 666. Further, at a subsequent iteration of FIG. 668, the system determines whether the additional simulated state instance has converged with a corresponding additional demonstrator state instance, for the additional time instance, as opposed to simply the time instance, as described above. Notably, the system may optionally determine whether the simulated state instance has converged with a corresponding subsequent demonstrator state instance at this subsequent iteration of block 668. If, at a subsequent iteration of block 668, the system determines that the additional subsequent simulated state instance has not converged with the corresponding additional subsequent demonstrator state instance, then the system returns to block 656 to re-initialize the simulated episode based on the initial demonstrator state instance, and continues with the method 600 to further update the ML model for the time instance and the additional time instance as described above. This process can be repeated until the additional subsequent simulated state instance converges with the corresponding additional subsequent demonstrator state instance for the additional time instance. If, at a subsequent iteration of block 668, the system determines that the additional subsequent simulated state instance converges with the corresponding additional subsequent demonstrator state instance, then the system proceeds to block 670 again. This process can be repeated for one or more of the time instances of the given time interval of the simulated episode. Assuming there are no more time instances for the given time interval at block 670, the system may then return to block 652 to obtain an additional initial demonstrator state instance from driving of the vehicle, and can repeat the method 600 of FIG. 6.

Figure 7:
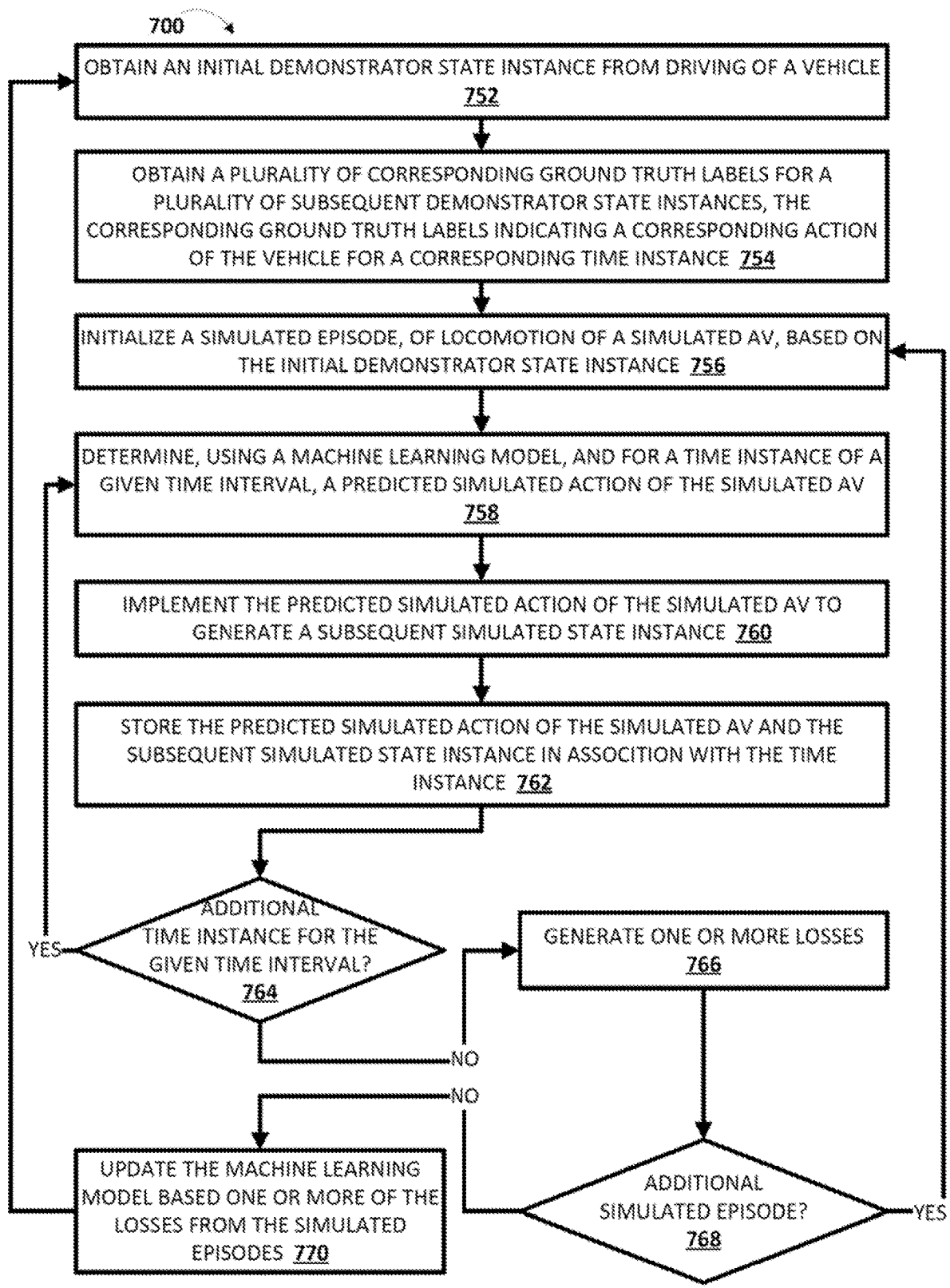
FIG. 7 is a flowchart illustrating an example method of updating the machine learning model of FIG. 5 based on an iterative simulation technique, in accordance with various implementations.

Turning now to FIG. 7, an example method 700 of updating the ML model of FIG. 5 based on an iterative simulation technique is depicted. For convenience, the operations of the method 700 are described with reference to a system that performs the operations. The system may include various components of various devices, including those described in FIGS. 1-3, server(s), local computing device(s) (e.g., laptop, desktop computer, and so on), other computing systems having memory and processors, or any combination thereof. Moreover, while operations of the method 700 are shown in a particular order, this is not meant to be limiting. One or more operations, elements, or steps may be reordered, omitted, or added.

At block 752, the system obtains an initial demonstrator state instance from driving of a vehicle. At block 754, the system obtains a plurality of corresponding ground truth labels for a plurality of subsequent demonstrator state instances, the corresponding ground truth labels indicating a corresponding action of the vehicle for a corresponding time instance. At block 756, the system initializes a simulated episode, of locomotion of a simulated AV, based on the initial demonstrator state instance. At block 758, the system determines, using a ML model, and for a time instance of a given time interval, a predicted simulated action of the simulated AV. At block 760, the system implements the predicted simulated action of the simulated AV to generate a subsequent simulated state instance based on the predicted simulated action of the simulated AV. Notably, the system can implement the operation of blocks 752-760 in the same or similar manner described above with respect to blocks 652-660 of the method 600 of FIG. 6. At block 762, the system stores the predicted simulated action of the simulated AV and the subsequent simulated state instance in association with the time instance. The system can store the predicted simulated action of the simulated AV and the subsequent simulated state instance in association with the time instance in one or more databases.

At block 764, the system determines whether there is an additional time instance for the given time interval. If, at an iteration of block 764, the system determines there is an additional time instance for the given time interval, then the system returns to block 758 to determine, using the ML model, and for the additional time instance of the given time interval, an additional predicted simulated action of the simulated AV, and the method 700 continues. In particular, the system can implement the additional predicted simulated action at a subsequent iteration of block 760 to generate an additional subsequent simulated state instance. Further, at a subsequent iteration of block 762, the system can store the additional predicted simulated action of the simulated AV and the additional subsequent simulated state instance in association with the additional time instance. This process can be repeated for each remaining time instance of the given time interval. If, at an iteration of block 764, the system determines there is not an additional time instance for the given time interval, then the system proceeds to block 766. At block 766, the system generates one or more losses. The system can generate one or more of the losses according to method 800 of FIG. 8 as described in detail below. Further, one or more of the losses can optionally be weighted according to method 900 of FIG. 9 as described in detail below.

At block 768, the system determines whether there is an additional simulated episode to be performed. The system can determine whether there is an additional simulated episode to be performed based on whether a threshold quantity of simulated episodes have been performed (e.g., 10 iterations, 20 iterations, 40 iterations, and so on) based on the initial demonstrator state instance. If, at an iteration of block 768, the system determines that there is an additional simulated episode, then the system may return to block 756 to initialize the additional simulated episode, of locomotion of the simulated AV, based on the initial demonstrator state instance, and repeat the operations of block 758-766 for the additional simulated episode. If, at an iteration of block 768, the system determines there are no additional simulated episodes to be performed, then the system may proceed to block 770. At block 770, the system updates the ML model based on one or more of the losses generated according to the method 800 of FIG. 8 (and optionally one or more weighted losses). For example, the system can aggregate one or more of the losses from one or more of the simulated episodes, and can update the ML model by backpropagating one or more of the losses across the ML model to update weights of the ML model. The system can then return to block 752 to obtain an additional initial demonstrator state instance and repeat the method 700 of FIG. 7 based on the additional initial demonstrator state instance.

Figure 8:
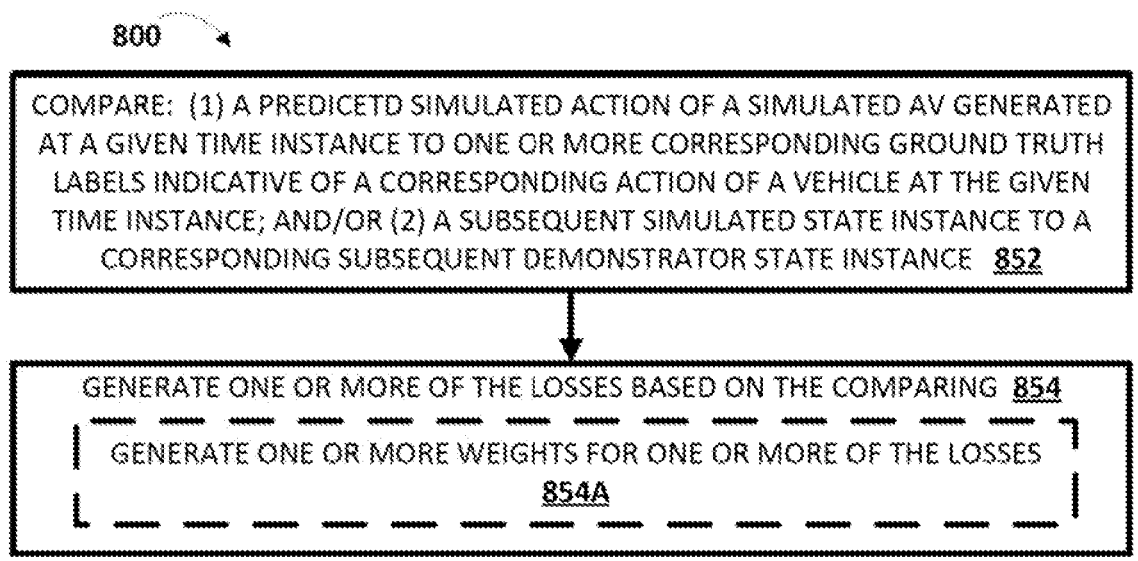
FIG. 8 is a flowchart illustrating an example method of generating one or more of the losses described in FIGS. 6 and 7, in accordance with various implementations.

Turning now to FIG. 8, an example method of generating one or more of the losses for updating the machine learning described in FIGS. 6 and 7 is depicted. For convenience, the operations of the method 800 are described with reference to a system that performs the operations. The system may include various components of various devices, including those described in FIGS. 1-3, server(s), local computing device(s) (e.g., laptop, desktop computer, and so on), other computing systems having memory and processors, or any combination thereof. Moreover, while operations of the method 800 are shown in a particular order, this is not meant to be limiting. One or more operations, elements, or steps may be reordered, omitted, or added.

At block 852, the system compares: (1) a predicted simulated action of a simulated AV determined at a given time instance to one or more corresponding ground truth labels indicative of a corresponding action of a vehicle at the given time instance; and/or (2) a subsequent simulated state instance to a corresponding subsequent demonstrator state instance. Notably, this comparing can occur at each time instance, and with respect to both the forward simulation technique described above with respect to FIGS. 3, 4A, 4B, and 6, and the iterative simulation technique described above with respect to FIGS. 3, 4C, 4D, and 7. For example, with respect to the forward simulation technique, this comparing can occur at one or more iterations of advancing the simulation, and can be utilized to determine whether or not a given iteration of the simulated episode has converged with a past episode. However, with respect to the iterative simulation technique, this comparing may only occur at the end of each simulated episode.

At block 854, the system generates one or more losses based on the comparing at block 852. In particular, comparing the actions can include comparing labels corresponding to the actions, probabilities corresponding to the magnitude components of the actions, steering angle components of the actions, other representations of the actions described herein, or any combination thereof. Moreover, comparing the state instances can include comparing poses corresponding to the vehicle and the simulated AV, state data vectors corresponding to the vehicle and the simulated AV, environmental data vectors corresponding to the vehicle and the simulated AV, other representations of the state instances herein, or any combination thereof. In some implementations, block 854 can include optional sub-block 854A. At optional sub-block 854A, the system generates one or more weights for one or more of the losses.

Figure 9:
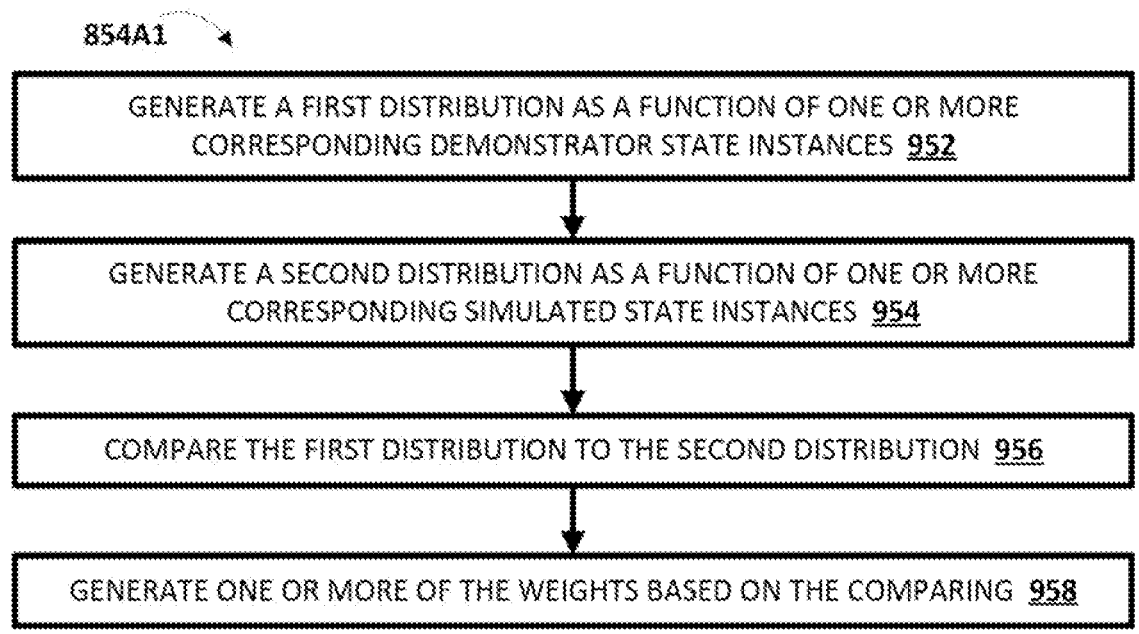
FIG. 9 is a flowchart illustrating an example method of generating one or more weights for one or more of the losses described in FIG. 8, in accordance with various implementations.

For example, and turning now to FIG. 9, an example method 900 of generating one or more weights for one or more of the losses described in FIG. 8 is depicted. At block 952, the system generates a first distribution as a function of one or more actions of a vehicle and one or more corresponding demonstrator state instances. In particular, the first distribution can be generated as a function of vehicle state features or environmental state features for one or more of the corresponding demonstrator state instances. Further, the system can generate the first distribution as a function of an initial demonstrator state instance and subsequent demonstrator state instances, of a past episode, that are subsequent to the initial demonstrator state instance. Further, the initial demonstrator state instance and the subsequent demonstrator state instances, of the past episode, correspond to those on the simulated episode of locomotion of the simulated AV is based. In other words, the first distribution can be generated as a function of demonstrator state instances that are generated during driving of the vehicle that correspond to the demonstrator state instances utilized in the method 600 of FIG. 6 or the method 700 of FIG. 7 described above.

At block 954, the system generates a second distribution as a function of each of one or more corresponding simulated state instances. In particular, the second distribution can be generated as a function of vehicle state features or environmental state features for each of the corresponding simulated state instances. Further, the system can generate the second distribution as a function of the subsequent simulated state instances generated during the simulated episode, of locomotion of the simulated AV, that is based on the initial demonstrator state instance utilized in generating the first distribution at block 952. In other words, the second distribution can be generated as a function of the subsequent simulated state instances that are generated during the simulated episode of locomotion of the simulated AV in the method 600 of FIG. 6 or the method 700 of FIG. 7. At block 956, the system compares the first distribution to the second distribution. The system can compare the first distribution and the second distribution by generating a density ratio (e.g., using a density ratio estimator) between the first distribution and the second distribution. At block 958, the system generates one or more of the weights based on the comparing at block 956. Accordingly, in generating one or more of the losses at block 664 of FIG. 6 or block 766 of FIG. 7, the system can generate one or more weighted losses, and the ML model can be updated based on the one or more losses at block 666 of FIG. 6 or block 770 of FIG. 7.

By updating the ML model based on one or more of the losses generated based on the method 800 of FIG. 8, the system can cause the updated ML model to proactively counter covariate shift in data encountered when the ML model is used by an AV in the real world. Further, by weighting one or more of the generated losses based on the method 900 of FIG. 9, the system can cause the ML model to proactively adjust for covariate shift in data encountered when the ML model is used by an AV in the real world. In other words, training the ML model in this manner allows the ML model to process diverse data in performing the simulated episodes of locomotion, and allows the ML model to learn not to weight various features too heavily, thereby addressing the causality problem, the feedback problem, or other problems in imitation learning. Moreover, by updating the ML model using the forward simulation technique or the iterative simulation technique and based on the losses described herein, the need for an interactive demonstrator to be queried during the simulation is obviated. This results in more efficient training of the ML model during training, and also results in a more robust model that can counter or adjust for covariate shift when used in AV planning in the real world. For example, by updating the ML model using these simulation techniques, and based on these losses, the ML model can dynamically adjust to different predicted simulated actions and different simulated state instances encountered in the simulated episodes, thereby enabling the ML model to dynamically adjust to different actions and state instances when used in AV planning in the real world.

Other variations will be apparent to those of ordinary skill. Therefore, the invention lies in the claims hereinafter appended.

What is claimed is:

1. A method for training a machine learning model for use in controlling autonomous vehicles, the method comprising:

obtaining an initial state instance from a past episode of manual driving of a real vehicle, the initial state instance comprising state data for a time instance of the past episode, the state data comprising sensor data from one or more sensors of the real vehicle or additional data derived from the sensor data corresponding to the time instance of the past episode;

obtaining, for the initial state instance and for each of a plurality of subsequent time instances of the past episode, a corresponding ground truth label that is based on manual driving data from the past episode or a subsequent annotation of the past episode;

performing a simulated episode of driving a simulated autonomous vehicle, wherein performing the simulated episode comprises:

initializing the simulated episode based on the initial state instance, wherein initializing the simulated episode based on the initial state instance comprises:

initializing the simulated autonomous vehicle in a simulated environment based on the sensor data from the one or more sensors of the real vehicle or the additional data derived from the sensor data at the time instance of the past episode;
progressing the simulated autonomous vehicle in the simulated environment during the simulated episode based on one or more predictions made by processing one or more instances of simulated state data using the machine learning model, wherein progressing the simulated autonomous vehicle in the simulated environment based on the one or more predictions causes the simulated autonomous vehicle to progress in a different manner than did the real vehicle in the past episode of manual driving; and
updating the machine learning model based on one or more losses that are based on a comparison of the one or more predictions and the corresponding ground truth labels.

2. The method of claim 1, wherein updating the machine learning model based on the one or more losses comprises updating the machine learning model subsequent to performing the simulated episode and prior to performing any subsequent simulated episode based on the machine learning model.

3. The method of claim 2, further comprising, subsequent to updating the machine learning model based on the one or more losses:
performing an additional simulated episode of driving the autonomous vehicle, wherein performing the additional simulated episode comprises:
initializing the additional simulated episode based on the initial state instance;
progressing the simulated autonomous vehicle in the simulated environment during the additional simulated episode based on one or more additional predictions made using the machine learning model, wherein the one or more additional predictions vary from the one or more predictions as a result of the one or more additional predictions being made using the machine learning model subsequent to updating the machine learning model based on the one or more losses; and
updating the machine learning model based on one or more additional losses that are based on a comparison of the one or more additional predictions and the corresponding ground truth labels.

4. The method of claim 2, wherein progressing the simulated autonomous vehicle in the simulated environment during the simulated episode comprises:
progressing the simulated episode for a first quantity of time instances that each comprise processing a corresponding one of the instances of simulated state data using the machine learning model to generate a corresponding one of the predictions, and progressing the simulated autonomous vehicle in the simulated environment based on the corresponding one of the predictions; and
continuing, until one or more conditions are satisfied, to iteratively update the machine learning model based on one or more further losses, each of the one or more further losses based on a comparison of one or more further predictions to the corresponding ground truth labels, and the one or more further predictions each based on a corresponding simulated episode that is also initialized based on the initial state instance and progressed for the first quantity of time instances and using the machine learning model as most recently updated.

5. The method of claim 4, further comprising, in response to determining that the one or more conditions are satisfied:
iteratively updating the machine learning model based on one or more additional further losses, each of the one or more additional further losses based on a comparison of one or more additional further predictions to the corresponding ground truth labels, the one or more additional further predictions each based on a corresponding additional simulated episode that is also based on the initial state instance, but is progressed for a second quantity of time instances using the machine learning model as most recently updated.

6. The method of claim 5, wherein the first quantity of time instances is one and the second quantity of time instances is two.

7. The method of claim 5, wherein the one or more conditions comprise determining that the machine learning model as most recently updated has converged.

8. The method of claim 7, wherein determining that the machine learning model as most recently updated has converged comprises determining that a corresponding one of the one or more additional further losses satisfies a threshold.

9. The method of claim 1, further comprising, prior to performing the simulated episode of driving the simulated autonomous vehicle:
processing the initial state instance and additional state instances of the past episode using the machine learning model to generate corresponding past episode based predictions;
generating one or more past losses for the past episode, wherein generating each of the past losses is based on a comparison of a corresponding one of the past episode based predictions to a corresponding one of the ground truth labels; and
updating the machine learning model based on the one or more past losses.

10. The method of claim 1, wherein the one or more predictions each comprise corresponding probabilities for one or more actions.

11. The method of claim 10, wherein the one or more actions comprise one or more acceleration values, one or more deceleration values, or one or more steering angle values.

12. The method of claim 10, wherein the one or more actions each indicate one or more of whether to yield, whether to stop, and whether to merge.

13. A method for training a machine learning model for use in controlling autonomous vehicles, the method comprising:
obtaining an initial demonstrator state instance from a past episode of manual driving of a real vehicle, wherein the initial demonstrator state instance comprises state data, wherein the state data comprises sensor data from one or more sensors of the real vehicle or additional data derived from the sensor data corresponding to the past episode;
obtaining a plurality of ground truth labels for a plurality of subsequent demonstrator state instances that are subsequent to the initial demonstrator state instance, each of the ground truth labels based on manual driving data from the past episode and indicating a corresponding action of the real vehicle for a corresponding time instance of the past episode;
initializing a simulated episode of locomotion of a simulated autonomous vehicle in a simulated environment based on the initial demonstrator state instance, wherein initializing the simulated episode based on the initial demonstrator state instance comprises:
- initializing the simulated autonomous vehicle in the simulated environment based on the sensor data from the one or more sensors of the real vehicle or the additional data derived from the sensor data;
- performing, for a given time interval, the simulated episode, wherein the given time interval includes a plurality of time instances; and
- during performance of an iteration of the simulated episode, and for each of the plurality of time instances;
  - determining, based on processing the initial demonstrator state instance using the machine learning model, one or more predicted simulated actions of the simulated autonomous vehicle;
  - implementing the one or more predicted simulated actions of the simulated autonomous vehicle to generate one or more simulated state instances that differ from the subsequent demonstrator state instances;
  - generating, based on a comparison of the one or more simulated state instances and the plurality of ground truth labels for the subsequent demonstrator state instances, one or more losses; and
  - updating the machine learning model based on the one or more losses.

14. The method of claim 13, wherein generating the one or more losses comprises:
- comparing the one or more simulated state instances to a temporally corresponding one of the subsequent demonstrator state instances; and
- wherein generating the one or more losses is based on comparing the one or more predicted simulated actions of the simulated autonomous vehicle to the temporally corresponding one of the subsequent demonstrator state instances.

15. The method of claim 14, wherein updating the machine learning model based on the one or more losses further comprises:
- backpropagating the one or more losses across the machine learning model to update the machine learning model.

16. The method of claim 14, further comprising:
- comparing a first distribution associated with manual driving of the real vehicle to a second distribution associated with the simulated episode of locomotion of the simulated autonomous vehicle,
  - the first distribution being a function of features of the initial demonstrator state instance and features of one or more of the subsequent demonstrator state instances, and
  - the second distribution being a function of one or more features of the simulated state instances; and
- wherein generating one or more of the losses comprises generating one or more weighted losses based on a comparison of the first distribution and the second distribution.

17. The method of claim 16, wherein updating the machine learning model based on the one or more losses further comprises:
- backpropagating the one or more weighted losses across the machine learning model to update the machine learning model during performance of the simulated episode.

18. The method of claim 13, further comprising, prior to performing the simulated episode:
- receiving user input that modifies one or more features of the initial demonstrator state instance to generate a modified initial demonstrator state instance, wherein the simulated episode is then initialized based on the modified initial demonstrator state instance.

19. The method of claim 13, wherein implementing the one or more predicted simulated actions of the simulated autonomous vehicle to generate the one or more simulated state instances that differ from the subsequent demonstrator state instances comprises:
- implementing a first predicted simulated action to generate a first simulated state instance of the one or more simulated state instances, the first predicted simulated action being determined based on processing the initial demonstrator state instance using the machine learning model; and
- implementing a second predicted simulated action to generate a second simulated state instance of the one or more simulated state instances, the second predicted simulated action being determined based on processing the first simulated state instance using the machine learning model.

20. A method for training a machine learning model for use in controlling autonomous vehicles, the method comprising:
- obtaining an initial state instance from a past episode of manual driving of a real vehicle, the state instance comprising state data for a time instance of the past episode, the state data comprising sensor data from one or more sensors of the real vehicle or additional data derived from the sensor data corresponding to the past episode;
- obtaining, for the initial state instance and for each of one or more subsequent state instances of the past episode, a corresponding ground truth label based on manual driving data from the past episode and that indicates a corresponding action of the real vehicle, wherein the corresponding ground truth label is ascribed by a human demonstrator;
- initializing a simulated episode of locomotion of a simulated autonomous vehicle in a simulated environment based on the initial state instance, wherein initializing the simulated episode based on the initial state instance comprises:
  - initializing the simulated autonomous vehicle in the simulated environment based on the sensor data from the one or more sensors of the real vehicle or the additional data derived from the sensor data;
- performing the simulated episode, wherein performing the simulated episode comprises, for each of a given quantity of one or more iterations:
  - processing, using the machine learning model, corresponding simulated state instances for the one or more iterations, to generate one or more corresponding predicted measures,
    - wherein an initially processed simulated state instance of the corresponding simulated state instances for an initial iteration of the one or more iterations is based on the initial state instance from the past episode of manual driving;
  - determining, based on the one or more corresponding predicted measures, a corresponding predicted action to implement; and
  - implementing the corresponding predicted action of the simulated autonomous vehicle to generate a corresponding subsequent simulated state instance to be processed using the machine learning model;
- generating one or more losses for the simulated episode, wherein generating each of the losses is based on a comparison of at least one of the one or more corresponding predicted measures generated to a corresponding one of the ground truth labels, wherein the corresponding one of the ground truth labels is used to determine the loss based on the corresponding one of the ground truth labels sequentially corresponding to the corresponding predicted action; and updating the machine learning model based on the one or more losses.

\* \* \* \* \*